US011550616B2

(12) United States Patent
Lolage et al.

(10) Patent No.: US 11,550,616 B2
(45) Date of Patent: Jan. 10, 2023

(54) VIRTUAL IP SUPPORT FOR BARE METAL CLOUD INFRASTRUCTURES

(71) Applicant: Nutanix, Inc., San Jose, CA (US)

(72) Inventors: Anupama Ashok Lolage, Santa Clara, CA (US); Nitin Parab, Palo Alto, CA (US)

(73) Assignee: Nutanix, Inc.

( * ) Notice: Subject to any disclaimer, the term of this patent is extended or adjusted under 35 U.S.C. 154(b) by 0 days.

(21) Appl. No.: 17/086,388

(22) Filed: Oct. 31, 2020

(65) Prior Publication Data

US 2021/0064414 A1 Mar. 4, 2021

Related U.S. Application Data

(63) Continuation-in-part of application No. 16/778,754, filed on Jan. 31, 2020, and a continuation-in-part of
(Continued)

(51) Int. Cl.
*H04L 67/10* (2022.01)
*G06F 9/455* (2018.01)
*H04L 45/02* (2022.01)
*H04L 41/082* (2022.01)
*G06F 9/54* (2006.01)
(Continued)

(52) U.S. Cl.
CPC ...... *G06F 9/45558* (2013.01); *G06F 9/45541* (2013.01); *G06F 9/547* (2013.01); *H04L 41/082* (2013.01); *H04L 45/02* (2013.01); *H04L 45/745* (2013.01); *H04L 61/5007* (2022.05); *H04L 67/10* (2013.01); *G06F 2009/45595* (2013.01); *H04L 2101/622* (2022.05)

(58) Field of Classification Search
CPC ....... G06F 9/45558; G06F 2008/45595; H04L 61/2007; H04L 61/2061; H04L 67/10; H04L 12/4641; H04L 61/6022
See application file for complete search history.

(56) References Cited

U.S. PATENT DOCUMENTS 6,590,861 B1 7/2003 Vepa et al.
8,549,518 B1 10/2013 Aron et al.
(Continued)

FOREIGN PATENT DOCUMENTS

CN 102307246 B 12/2015
CN 109067931 A 12/2018

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown).
(Continued)

*Primary Examiner* — Ryan J Jakovac
(74) *Attorney, Agent, or Firm* — Vista IP Law Group, LLP

(57) ABSTRACT

Disclosed is an improved approach for managing floating/virtual IP addresses in a virtualization system. Where a bare metal cloud provider does not provide adequate facilities to implement broadcast operations, the approach would capture broadcast packets, and from the captured packets, generate calls to the cloud provider to implement configuration changes to reflect the changes desired by the broadcast packets.

24 Claims, 13 Drawing Sheets

Related U.S. Application Data application No. 16/778,725, filed on Jan. 31, 2020, now Pat. No. 11,438,280.

(60) Provisional application No. 62/939,567, filed on Nov. 22, 2019, provisional application No. 62/939,569, filed on Nov. 22, 2019, provisional application No. 62/894,734, filed on Aug. 31, 2019, provisional application No. 62/894,675, filed on Aug. 30, 2019.

(51) Int. Cl.
*H04L 45/745* (2022.01)
*H04L 61/5007* (2022.01)
*H04L 101/622* (2022.01)

(56) References Cited

U.S. PATENT DOCUMENTS

| | | | |
|---|---|---|---|
| 8,601,473 | B1 | 12/2013 | Aron et al. |
| 8,850,130 | B1 | 9/2014 | Aron et al. |
| 9,081,603 | B2 | 7/2015 | Zhang et al. |
| 9,110,703 | B2 | 8/2015 | Santos et al. |
| 9,515,930 | B2 | 12/2016 | Devireddy et al. |
| 9,634,948 | B2 | 4/2017 | Brown et al. |
| 9,692,696 | B2 | 6/2017 | Decusatis et al. |
| 9,772,866 | B1 | 9/2017 | Aron et al. |
| 9,825,905 | B2 | 11/2017 | Thakkar et al. |
| 10,333,827 | B2 | 6/2019 | Xu et al. |
| 2010/0146160 | A1 | 6/2010 | Piekarski |
| 2012/0079143 | A1 | 3/2012 | Krishnamurthi et al. |
| 2013/0308641 | A1 | 11/2013 | Ackley |
| 2014/0157269 | A1 | 6/2014 | Dow et al. |
| 2014/0241353 | A1 | 8/2014 | Zhang et al. |
| 2015/0117256 | A1 | 4/2015 | Sabaa et al. |
| 2015/0128245 | A1 | 5/2015 | Brown et al. |
| 2015/0180824 | A1* | 6/2015 | Atanasov ............ H04L 61/2015 709/224 |
| 2016/0105393 | A1 | 4/2016 | Thakkar et al. |
| 2016/0323245 | A1* | 11/2016 | Shieh .................. H04L 63/0263 |
| 2016/0337236 | A1 | 11/2016 | Hsu et al. |
| 2016/0373405 | A1 | 12/2016 | Miller et al. |
| 2017/0295130 | A1 | 10/2017 | Mahajan et al. |
| 2018/0060051 | A1 | 3/2018 | Ramalingam et al. |
| 2018/0309718 | A1 | 10/2018 | Zuo |
| 2019/0036868 | A1 | 1/2019 | Chandrashekhar et al. |
| 2019/0260685 | A1 | 8/2019 | Tsirkin |
| 2020/0076689 | A1* | 3/2020 | Chandrashekar ... G06F 9/45558 |
| 2020/0329047 | A1* | 10/2020 | Powers ................... H04L 63/20 |

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication date based on indicated capture date by Archive.org; first publication date unknown).

Poitras, Steven. "TheNutanix Bible" (Sep. 4, 2015), from https://nutanixbible.com/.

Poitras, Steven. "The Nutanix Bible" (Jan. 12, 2016), from https://nutanixbible.com/.

Poitras, Steven. "The Nutanix Bible" (Jun. 9, 2016), from https://nutanixbible.com/.

Poitras, Steven. "The Nutanix Bible" (Jan. 3, 2017), from https://nutanixbible.com/.

Poitras, Steven. "The Nutanix Bible" (Jun. 8, 2017), from https://nutanixbible.com/.

Poitras, Steven. "The Nutanix Bible" (Jan. 3, 2018), from https://nutanixbible.com/.

Poitras, Steven. "The Nutanix Bible" (Jun. 25, 2018), from https://nutanixbible.com/.

Poitras, Steven. "The Nutanix Bible" (Jan. 8, 2019), from https://nutanixbible.com/.

Poitras, Steven. "The Nutanix Bible" (Jul. 9, 2019), from https://nutanixbible.com/ (Publication date based on indicated capture date by Archive.org; first publication date unknown).

Cano, I. et al., "Curator: Self-Managing Storage for Enterprise Clusters", 14th USENIX Symposium on Networked Systems Design and Implementation, NSDI '17, (Mar. 27, 2017).

Mellor, C., "Nutanix ushers its software onto AWS", Blocks & Files, (May 2019).

Gill, B. et al., "Technical Preview: Nutanix on AWS: Making Lift and Shift Invisible", NEXTConference, (May 2019).

Devarapalli, S. et al., "Xi Clusters: Accerate Your Hybrid Cloud Journey with Nutanix in Public Clouds", NEXTConference, Oct. 2019).

"Configuring alias IP ranges", Google Cloud, (Last updated Jun. 22, 2020).

"Adding secondary IP addresses", Skytap, (Oct. 4, 2017), date retrieved from google.

Apache, "Managing Networks and Traffic", CloudStack Administration Documentation v4.8, (Feb. 17, 2016), date retrieved from google.

Desmouceaux, Y. et al., "Zero-Loss Virtual Machine Migration with IPv6 Segment Routing", 1st Workshop on Segment Routing and Service Function Chaining (SR+SFC 2018), (Nov. 2018).

Le, F. et al., "Experiences Implementing Live VM Migration over the WAN with Multi-Path TCP", (Apr. 29-May 2, 2019).

Poitras, Steven. "The Nutanix Bible" (Feb. 3, 2020), from https://nutanixbible.com/ (Publication date based on indicated capture date by Archive.org; first publication date unknown).

Poitras, Steven. "The Nutanix Bible" (Aug. 1, 2020), from https://nutanixbible.com/ (Publication date based on indicated capture date by Archive.org; first publication date unknown).

Non-Final Office Action dated Sep. 1, 2020 for related U.S. Appl. No. 16/778,725.

Final Office Action dated Feb. 2, 2021 for related U.S. Appl. No. 16/778,725.

Non-Final Office Action dated May 14, 2021 for related U.S. Appl. No. 16/778,725.

European Search Report dated Jan. 25, 2021 for related EP Application No. 20193500.4.

Conole et al., "Open vSwitch Documentation: Release 2.6.0", Open vSwitch Developers, (Jan. 7, 2017).

Non-Final Office Action dated Aug. 16, 2021 for related U.S. Appl. No. 17/086,376.

Non-Final Office Action dated Aug. 27, 2021 for related U.S. Appl. No. 16/778,754.

Rouse, M. et al. "VLAN (virtual LAN)", WhatIs.com, (Updated on Aug. 2019).

Final Office Action dated Apr. 5, 2022 for U.S. Appl. No. 16/778,754.

Final Office Action dated Nov. 24, 2021 for related U.S. Appl. No. 16/778,725.

Notice of Allowance for U.S. Appl. No. 16/778,725 dated Jul. 13, 2022.

Notice of Allowance for U.S. Appl. No. 17/086,376 dated Apr. 18, 2022.

Non-Final Office Action for U.S. Appl. No. 16/778,754 dated Sep. 29, 2022.

\* cited by examiner

MAC Address Translation Table 210₁

| Virtual Machine Identifier | Cloud Provider's IP Address | Virtualization System MAC Address | Cloud Provider's MAC Address | |
|---|---|---|---|---|
| VM1 | IP1 | PM1 | SM1 | } Node1 |
| VM2 | IP2 | PM2 | SM2 | } Node2 |
| VM3 | IP3 | PM3 | SM3 | } Node3 |
| ⋮ | ⋮ | ⋮ | ⋮ | |

MAC Address Translation Table 210₂

| Virtual Machine Identifier | Cloud Provider's IP Address | Virtualization System MAC Address | Cloud Provider's MAC Address | | |
|---|---|---|---|---|---|
| VM1 | IP1 | PM1 | SM1 | } vNIC1 | } Node1 |
| VM2 | IP2 | PM2 | SM2 | } vNIC2 | } Node2 |
| VM3 | IP3 | PM3 | SM3 | } vNIC3 | } Node3 |
| VM4 | IP4 | PM4 | SM3 | } vNIC3 | |
| ⋮ | ⋮ | ⋮ | ⋮ | | |

FIG. 2A

Routing Table 112

| Cloud Provider's IP Address | Cloud Provider's MAC Address |
|---|---|
| IP1 | SM1 |
| IP2 | SM2 |
| IP3 | SM3 |
| IP4 | SM3 |
| ⋮ | ⋮ |

FIG. 2B

VIRTUAL IP SUPPORT FOR BARE METAL CLOUD INFRASTRUCTURES

CROSS-REFERENCE TO RELATED APPLICATIONS

The present application is a continuation-in-part of U.S. application Ser. No. 16/778,754, filed on Jan. 31, 2020, which claims the benefit of priority to U.S. Provisional Application No. 62/939,569, filed on Nov. 22, 2019, U.S. Provisional Application No. 62/939,567, filed on Nov. 22, 2019, U.S. Provisional Application No. 62/894,734, filed on Aug. 31, 2019, and U.S. Provisional Application No. 62/894,675, filed on Aug. 30, 2019, and is also a continuation-in-part of U.S. application Ser. No. 16/778,725, filed on Jan. 31, 2020, which claims the benefit of priority to U.S. Provisional Application No. 62/939,569, filed on Nov. 22, 2019, U.S. Provisional Application No. 62/939,567, filed on Nov. 22, 2019, U.S. Provisional Application No. 62/894,734, filed on Aug. 31, 2019, and U.S. Provisional Application No. 62/894,675, filed on Aug. 30, 2019, which are all hereby incorporated by reference in their entirety.

FIELD

This disclosure relates to cloud computing, and more particularly to techniques for implementing virtualization in a cloud infrastructure.

BACKGROUND

A "virtual machine" or a "VM" refers to a specific software-based implementation of a machine in a virtualization environment, in which the hardware resources of a real computer (e.g., CPU, memory, etc.) are virtualized or transformed into the underlying support for the fully functional virtual machine that can run its own operating system and applications on the underlying physical resources just like a real computer.

Virtualization works by inserting a thin layer of software directly on computer hardware or on a host operating system. This layer of software contains a virtual machine monitor or hypervisor that allocates hardware resources dynamically and transparently. Multiple operating systems run concurrently on a single physical computer and share hardware resources with each other. By encapsulating an entire machine, including CPU, memory, operating system, and network devices, a virtual machine is completely compatible with most standard operating systems, applications, and device drivers. Most modern implementations allow several operating systems and applications to safely run at the same time on a single computer, with each having access to the resources it needs when it needs them.

Virtualization allows one to run multiple virtual machines on a single physical machine, with each virtual machine sharing the resources of that one physical computer across multiple environments. Different virtual machines can run different operating systems and multiple applications on the same physical computer.

One reason for the broad adoption of virtualization in modern business and computing environments is because of the resource utilization advantages provided by virtual machines. Without virtualization, if a physical machine is limited to a single dedicated operating system, then during periods of inactivity by the dedicated operating system the physical machine is not utilized to perform useful work. This is wasteful and inefficient if there are users on other physical machines which are currently waiting for computing resources. To address this problem, virtualization allows multiple VMs to share the underlying physical resources so that during periods of inactivity by one VM, other VMs can take advantage of the resource availability to process workloads. This can produce great efficiencies for the utilization of physical devices, and can result in reduced redundancies and better resource cost management.

Cloud-based infrastructures are now commonly used to implement virtualization environments. There are numerous approaches that can be taken to utilize virtualization in cloud-based systems. One approach is where the cloud provider provides and manages the virtualization environment and its infrastructure in the cloud, and customers are provided virtual machines by the cloud provider from that virtualization environment. Another scenario is the "bare metal" approach, where the customer implements the customer's own virtualization environment on top of the bare metal infrastructure provided by the cloud provider, and the customer allocates and creates its own virtual machines from the customer-implemented virtualization infrastructure.

The bare metal approach is very useful in situations where the customer would like to retain a high degree of control and customization over the way that the virtualization infrastructure is implemented and structured in the cloud. However, since the customer is working within the confines of the cloud provider's underlying infrastructure, this means that the virtualization environment implemented by the customer must be able to work with, and is often limited by, the bounds of the interfaces and features provided to the customer from the cloud infrastructure. For example, the cloud provider's underlying networking infrastructure must be used to facilitate communications to and from the virtual machines in the customer-implemented virtualization environment.

However, in some cases, the bare metal cloud provider may not provide adequate facilities to implement a full range of networking services that the customer may rely upon, and which would otherwise exist in non-cloud environments. For example, a bare metal cloud provider may not provide a broadcast fabric, such as the broadcast domain that would normally be used to facilitate GARP (gratuitous address resolution protocol) packets. There are many reasons that the cloud provider may not provide such broadcast operations. For example, the cloud provider may consider the overhead consumed by typical broadcast operations to be too expensive given the extensive replication of packets that would be required for many broadcast functions, and thus limits the use of broadcasts to minimize such network costs. The problem is that this situation is problematic for any networking scenario where the functioning of the customer-provided virtualization environment is dependent upon the existence of such broadcast services.

What is needed is a technique or techniques that avoid unwanted effects and/or network interruptions when implementing virtualization in a bare metal cloud infrastructure that does not provide sufficient networking infrastructures.

SUMMARY

The present disclosure describes techniques used in systems, methods, and in computer program products to implement an improved approach for managing floating/virtual IP addresses in a virtualization system. With embodiments of the current approach, floating/virtual IP addresses can be supported on any substrate in real time while incurring minimal traffic disruption.

The disclosed embodiments modify and improve over legacy approaches. In particular, the herein-disclosed techniques provide technical solutions that address the technical problems attendant to the fact that a cloud-based infrastructure may not provide or allow for broadcast operations. Such technical solutions involve specific implementations (i.e., data organization, data communication paths, module-to-module interrelationships, etc.) that relate to the hardware and software arts for improving computer functionality to implement system updates and management even in the absence of broadcast operations by the cloud infrastructure.

Many of the herein-disclosed embodiments for managing networking addresses in a virtualization system are technological solutions pertaining to technological problems that arise in the hardware and software arts that underlie cloud computing. Aspects of the present disclosure achieve performance and other improvements in peripheral technical fields including, but not limited to, hyperconverged computing platform networking and hyperconverged computing platform management.

Further details of aspects, objectives, and advantages of the technological embodiments are described herein, and in the drawings and claims.

BRIEF DESCRIPTION OF THE DRAWINGS

The drawings described below are for illustration purposes only. The drawings are not intended to limit the scope of the present disclosure.

FIG. 2A presents MAC (media address control) address translation table models that are used to correlate cloud provider networking addresses to network-accessible entities in a virtualization system, according to some embodiments.

FIG. 2B presents a routing table model that is used to route traffic to network-accessible entities in a virtualization system, according to an embodiment.

DETAILED DESCRIPTION

Figure 1A:
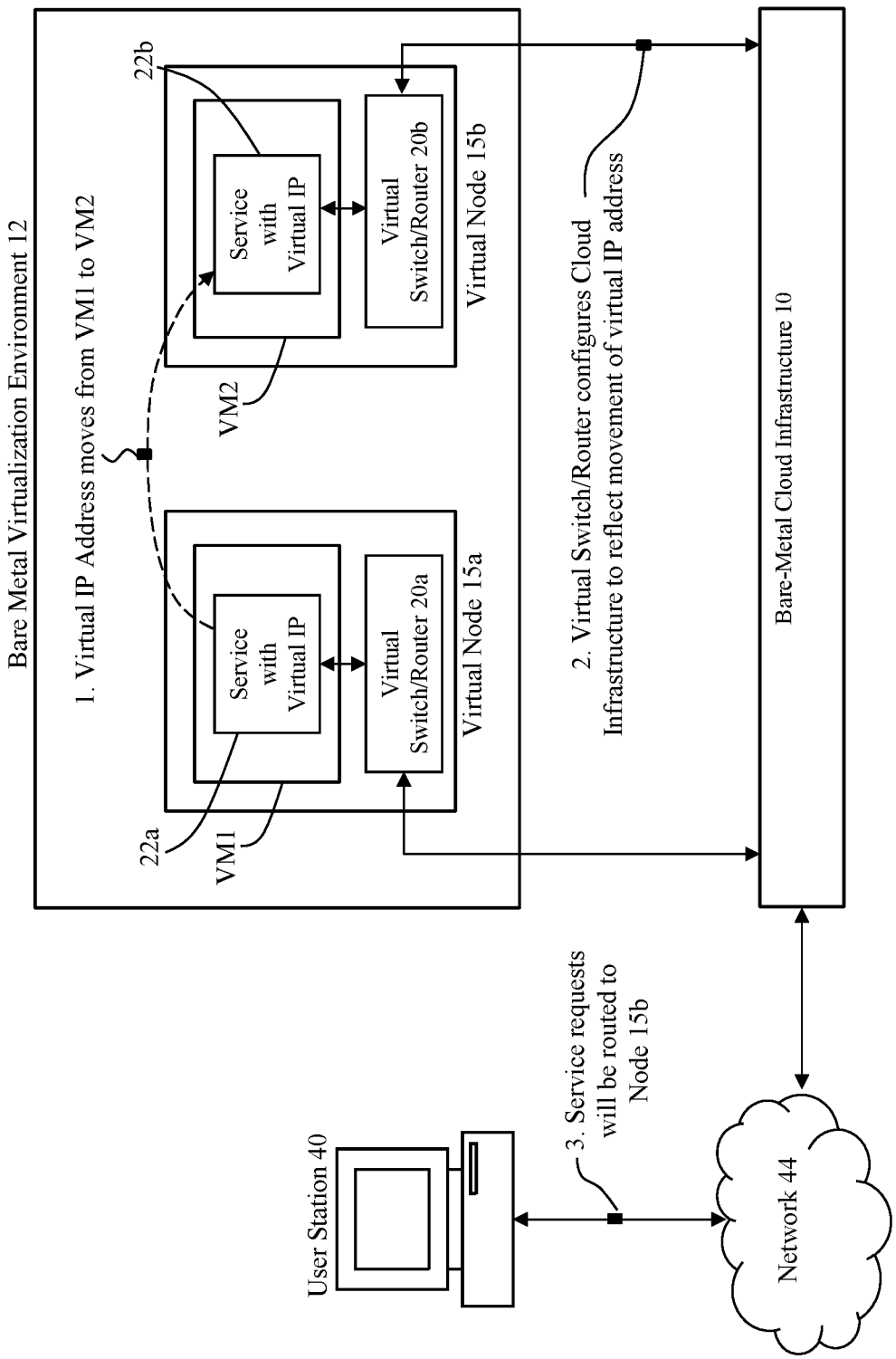
FIG. 1A illustrates an approach to implement some embodiments of the invention.

Some embodiments are directed to improved approaches for managing IP addresses in a virtualization system. The accompanying figures and discussions herein present example environments, systems, methods, and computer program products that correlate cloud provider networking addresses to network-accessible entities in a virtualization system.

Some of the terms used in this description are defined below for easy reference. The presented terms and their respective definitions are not rigidly restricted to these definitions a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments-they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

As discussed above, a bare metal cloud provider may not provide adequate facilities to implement a full range of networking services that would otherwise exist in non-cloud environments. For example, the bare metal cloud provider may not provide a broadcast fabric that would otherwise be normally used to facilitate GARP packets.

One example situation where this is problematic is the scenario where a user of a customer-provided virtualization environment in the bare metal cloud infrastructure implements an application or service that is associated with a "virtual IP address", which is often also called a "floating IP address". A virtual/floating IP address (which may be referred to herein using either terminology) in the current context is an IP address that can be moved between different applications or services.

To explain, consider the example system shown in FIG. 1A, where a cloud provider may provide a bare metal cloud infrastructure 10 that is used by a customer to implement a bare metal virtualization environment 12. The bare metal virtualization environment 12 implemented by customer includes all of the necessary infrastructure to create and maintain virtualization for users of the environment. As such, a user may choose to provision multiple virtual machines into the environment, such as virtual machines VM1 and VM2. Each of the virtual machines VM1 and VM2 may be installed onto a node or virtual node in the virtualization environment, e.g., where VM1 is installed onto virtual node 15*a* and VM2 is installed onto virtual node 15*b*.

A service (or application) 22*a* may be initially implemented on virtual machine VM1. Assume that service 22*a* is associated with a virtual/floating IP address that is capable of being quickly moved to another application or service. There are any number of valid reasons for assigning a virtual/floating IP address to an entity in a computing system. For example, this approach is often used to implement redundancy or high availability, since many computing systems seek to avoid having a single point of failure. Assume that service 22*a* performs a mission critical function within the system on behalf of a user at user station 40. If service 22*a* stops functioning correctly or becomes unavailable (and/or the virtual machine VM1 or the node 15*a* that hosts the service 22*a* undergoes a failure), then it would be desirable to move the virtual IP address to another service 22*b*. By moving the virtual IP address from VM1 to VM2, this allows the same IP address to be usable by the user to continue handling workloads with minimal interruptions, since the user's request for the service or application would automatically be directed to the new VM that is now associated with the virtual IP address.

In a typical computing system having broadcast capabilities, this movement of the virtual IP address is easily handled with the sending of GARP packets by the second virtual machine VM2 that is now associated with the virtual IP address. The GARP packets are broadcast across the network to other entities in the network such that all other entities will update their respective ARP caches to reflect the correct location of the virtual IP address. The ARP protocol provides IP communications within a Layer 2 broadcast domain to map the virtual IP address to the correct MAC address associated with the new hosting virtual machine VM2.

However, in a bare metal cloud infrastructure 10 that does not provide sufficient broadcast capabilities, these types of GARP packets are not useable to handle these movements of virtual IP addresses. What this means is that the underlying networking metadata and data structures managed by the bare metal cloud infrastructure 10 will be unable, from standard GARP packets, to learn about the new location for the virtual IP address after its movement between different virtual machines on different nodes/virtual nodes. This failure to update the underlying networking metadata and data structures managed by the bare metal cloud infrastructure 10 could cause any communications from the user at user station 40 to be directed to the wrong virtual machine after the movement of the virtual IP address.

The current embodiments of the invention provide an efficient and effective solution to this problem, where a mechanism within the virtual node is capable of capturing the GARP packets issued by the virtual machine, to recognize the context in which the GARP packets were issued, and to then issue the appropriate API commands to the bare metal cloud infrastructure to make the necessary changes to the underlying network configuration data to associate the virtual IP address with the new host virtual machine.

In some embodiments of the invention, the logic to perform the above actions are placed into the virtual switch or virtual router that is located in each of the virtual nodes. As shown in FIG. 1A, virtual node 15*a* includes a virtual switch or virtual router 20*a* while virtual node 15*b* includes a virtual switch or virtual router 20*b*.

In operation, as shown in step 1 of FIG. 1A, the process begins when the virtual IP address that is currently associated with VM1 is moved to VM2. Prior to the movement of the virtual IP address, the underlying network metadata maintained by the bare metal cloud infrastructure 10 maps the virtual IP address to the MAC address associated with the virtual network interface card (vNIC) associated with virtual node 15*a*. Therefore, until the underlying network metadata is changed at the cloud provider, any communications sent by the user station 40 over network 44 for the virtual IP address will be directed by the bare metal cloud infrastructure 10 to the vNIC for virtual node 15*a*, where the virtual switch 20*a* will then seek to send that communications to service 22*a* within VM1.

With the current embodiment of the invention, after the virtual IP address has moved to VM2, GARP packets will be issued by VM2. The GARP packets will announce the association of the virtual IP address to the network identification information associated with VM2. The GARP packets issued by VM2 will be captured by the virtual switch 20*b* on virtual node 15*b*. The virtual switch 15*b* will recognize that the underlying network metadata for the cloud infrastructure should reflect the fact that the moved virtual IP address should be associated with VM2. Therefore, as shown at step 2, the virtual switch 15*b* will issue the appropriate API calls to configure the bare metal cloud infrastructure 10 so that any underlying networking metadata that needs to be updated is correctly updated to reflect the association of the virtual IP address to the network identification information for VM2. The appropriate metadata at the virtual switch/router 20*b* will also be updated at this time.

After this update, as shown in step 3, any subsequent communications from user station 40 that is directed to the virtual IP address across network 44 will now be sent by the bare metal cloud infrastructure 10 to the correct virtual node 15*b* that hosts the virtual machine VM that is handling the service 22*b*.

This approach therefore provides numerous advantages over conventional cloud-based virtualization systems. Embodiments of the current invention allow for correct updating of networking metadata after a virtual IP address is moved, even if the underlying bare metal cloud infrastructure does not provide sufficient broadcast capabilities to handle standard GARP packets on a Level 2 broadcast domain. The approach of the inventive embodiments to capture broadcast messages and to translate into API calls for an underlying cloud infrastructure is applicable to any scenario where such an update is required, and is not limited in its application only to the situation involving a movement of a virtual IP address. Moreover, this inventive approach can be used for existing computing entities that are reliant on using broadcast messages (such as GARP packets), without requiring the user to re-write the codebase for the virtual machine, application, or service to change to an approach that makes API calls specific to a given cloud-vendor. Instead, the inventive embodiment will capture the broadcast message, and will understand the circumstances enough to automatically generate the required API calls to effect the desired outcome.

Illustrative Implementation of a Bare Metal Virtualization Environment

When deploying a virtualization system onto a "bare metal" computing node of a cloud provider, a wide range of the cloud provider's services are needed to "instantiate" the virtualization system. Fortunately, cloud computing providers publish application programming interfaces (APIs) that facilitate deployment of a virtualization system onto a "bare metal" computing node. For example, a cloud provider might publish an API that, when called, retrieves an "instance" (i.e., a runnable set of computer instructions) and loads the instance onto an available computing node. As another example, a cloud provider might publish an API that, when called, initiates execution of the instance that was just loaded onto the available computing node. As yet another example, a cloud provider might publish an API that packages local results from execution of the instance and store the results in a network-accessible location. The deployer can then access the network-accessible location to see the results.

In some cases, such as are discussed herein, an "instance" might be an entire virtualization environment, complete with a full complement of virtualization components such as virtual machine computing capabilities, virtual networking capabilities, a hypervisor that virtualizes many or all aspects of an operating system, virtual memory, virtual I/O (input/output or IO) devices, and so on. In some cases, a virtualization system might be self-contained in a manner such that all computing features needed (e.g., computer MIPS, local storage, etc.) to accomplish a particular computing task are supplied by the bare metal computing node. However, in many cases, a particular virtualization system might need networking features beyond those supplied by the bare metal computing node so as to access resources outside of the bare metal node. In such cases, the virtualization system needs to access the cloud provider's networking infrastructure.

Unfortunately, there are many scenarios where the features corresponding the cloud-provided networking infrastructure are insufficient. As one example, the cloud-provided networking infrastructure might include a limited set of networking access points (e.g., IP addresses), whereas the virtualization environment might need to define a larger, possibly much larger set of (virtual) networking access points (e.g., a large number of virtual machines). This raises the need for the virtualization system to manage network communications to and from the cloud-provided networking infrastructure. To illustrate, a virtualization system might create many hundreds or thousands of virtual machines (VMs), each of which individual virtual machines are to be accessed via a correspondingly large set of VM-specific internet protocol (IP) address and media address control (MAC) addresses, yet the cloud-provided networking infrastructure might only have a much smaller set of MAC addresses available. This sets up a one-to-many situation where a single MAC address provided by the cloud provider needs to be mapped to many networking addresses corresponding to many VMs.

Figure 1B:
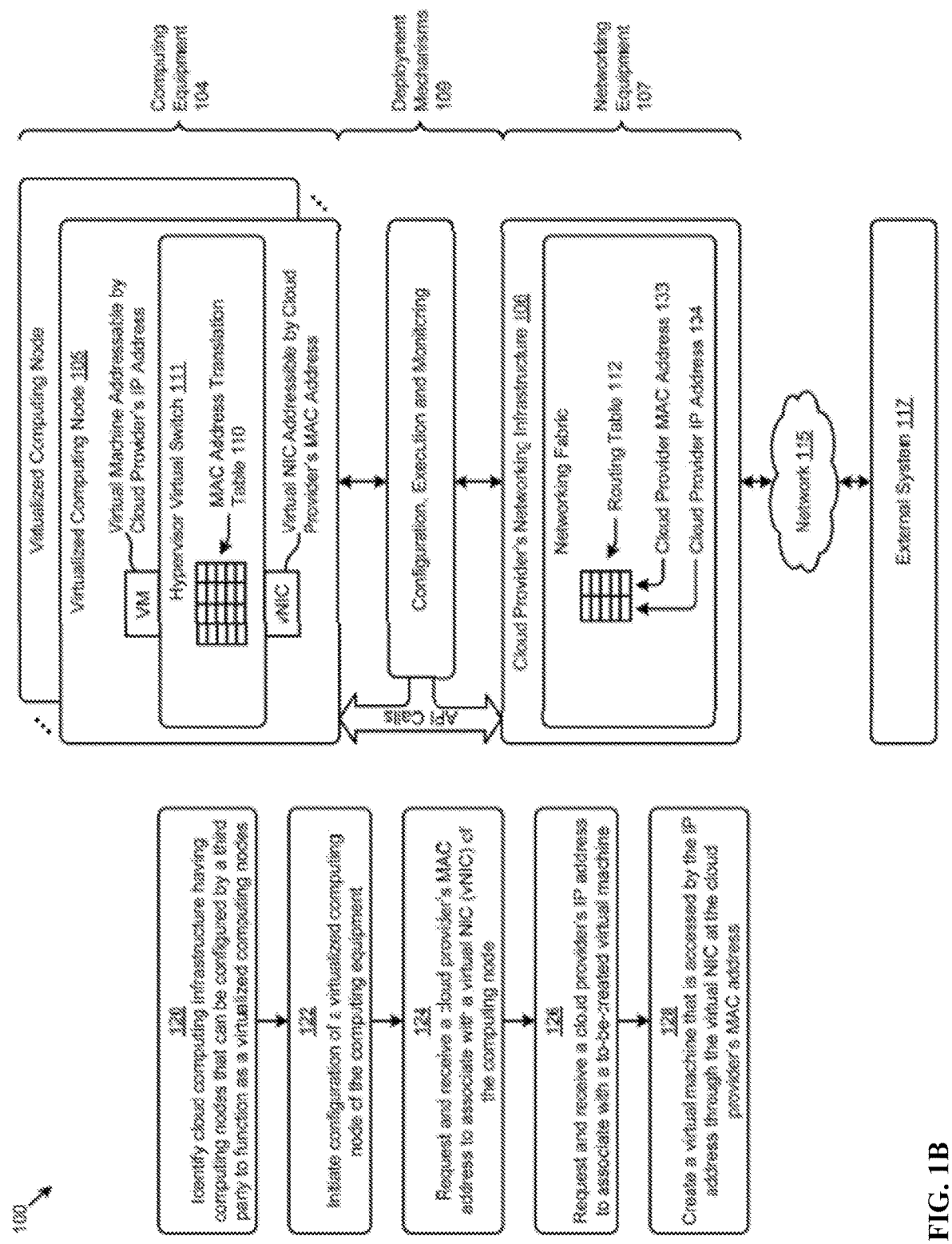
FIG. 1B exemplifies an environment in which embodiments of the present disclosure can operate.

FIG. 1B exemplifies an environment 100 in which embodiments of the present disclosure can operate. As an option, one or more variations of environment 100 or one or more variations of the shown steps may be implemented in the context of the architecture and functionality of the embodiments described herein.

FIG. 1B illustrates a context and steps that pertain to maintaining cloud provider networking addresses that correlate to virtual machine networking addresses in a virtualization system. Specifically, the figure is being presented to illustrate the juxtaposition of a deployment stack as well as to illustrate one example set of steps to initially configure a virtualization environment by a customer on top of networking equipment made available by a cloud computing provider (e.g., in the cloud environment AWS provided by Amazon Corporation).

The embodiment shown in FIG. 1B is merely one example. As shown, the environment comprises computing equipment 104 that are situated atop cloud-provided networking equipment 107. Various deployment mechanisms 109 are depicted. Such mechanisms include techniques for configuration, execution and monitoring. More specifically, such mechanisms include techniques for initial configuration of a virtualized computing node 105 onto the computing equipment 104, techniques for invoking runnable computing entities in a virtualization environment, and techniques for monitoring the execution. As used herein, a virtualized computing node 105 is an instruction processor (e.g., CPU) onto which software comprising a virtualization system (e.g., a host operating system and a hypervisor) is installed. As such, a virtualized computing node 105 can be formed by loading virtualization software onto unconfigured (e.g., "bare metal") computing equipment.

As shown API calls can be used to communicate between the virtualized computing node 105 and the cloud provider's networking infrastructure 106. More specifically, the API calls can be used to initialize and maintain a routing table 112 that is situated within the networking fabric of the cloud provider's networking infrastructure. Further the API calls can be used to request and retrieve network addresses that derive from the cloud provider's networking infrastructure. In some situations, a single API call is used to request a single IP address or MAC address. In other situations, a single API call is used to request a group (e.g., pool) of IP addresses that correspond to a particular MAC address of the cloud provider's networking infrastructure. These addresses are used by a hypervisor virtual switch 111 to perform inbound and outbound network traffic routing. As an example, hypervisor virtual switch 111 can route traffic to a virtual machine that is addressable at a IP address allocated by a cloud provider.

As shown, the cloud provider's networking infrastructure 106 maintains a routing table that includes a correspondence between a particular MAC address and a particular IP address. In many cases the routing table includes a correspondence between a particular single MAC address and multiple IP addresses in a one-to-many correspondence. This one-to-many correspondence allows a single networking interface to serve many virtual machines. As such, the virtualized system that is installed onto computing equipment 104 to instantiate virtualized computing node 105 can freely create a large number of virtual machines, each of which are associated with a single virtual network interface (vNIC).

An example of a configuration of such a virtualized system that has been installed onto computing equipment 104 is given in the context and flow of step 120, step 122, step 124, step 126 and step 128. Specifically, the aforementioned flow operates within a context of the shown cloud computing infrastructure that provides computing nodes (e.g., bare metal nodes) that can be configured by a third party (step 120).

In the example of FIG. 1B, the computing node or nodes are configured to function as virtualized computing nodes. Operation of one or more of the shown operations serve to initialize or "bring-up" a node, even if the node initially has no software other than its basic input/output subsystem (BIOS). As a pertinent bring-up example, step 122 loads virtualization system code, including a host operating system, one or more guest operating systems, a hypervisor, and a library of virtualized components, any or all of which are configured to operate on the particular hardware that comprises the subject node. Certain components of the virtualization system (e.g., the hypervisor, monitoring agents, etc.) are "booted-up". Next, in order to initialize a virtual NIC, at step 124, an API is called to request and receive a cloud provider's MAC address 133. The operation of the API causes this MAC address to be recorded in one or more routing tables of the networking fabric. Strictly as one example, routing table 112 is shown as having multiple rows and multiple columns, where a particular row and column can store a cloud provider's MAC address.

This cloud provider's MAC address 133 is also stored in the hypervisor virtual switch 111. In the example shown the cloud provider's MAC address 133 is stored as an entry in the MAC address translation table 110 (MAT). Further in the example shown, the cloud provider's MAC address 133 is used to initialize the vNIC of the virtualized computing node 105. As such, traffic that is destined for the vNIC of the virtualized computing node can be directed through the cloud provider's networking infrastructure (e.g., using layer 2 switching).

Although the foregoing provides a layer 2 switching technique, packets include an IP address as well, which IP address is associated in a one-to-one relationship with a virtual machine, and such a unique IP address is needed in order to create a virtual machine. As such, step 126 serves to request and receive IP addresses from the cloud provider, which cloud provider's IP address 134 is then associated with a to-be-created virtual machine. Step 128 then serves to create a virtual machine that is accessible at the cloud provider's IP address 134 through the virtual NIC that is addressable by the cloud provider's MAC address 133.

Since the foregoing virtual machine has a unique IP address and is accessible through the aforementioned vNIC, network traffic packets can be addressed to the virtual machine, which network traffic packets can be sent from any external system 117 through the Internet or any other network 115.

The foregoing discussion of FIG. 1B includes a description of techniques by which network traffic packets can be addressed to a particular virtual machine that is situated at a particular NIC with a particular cloud provider's MAC address. Furthermore FIG. 1B discloses a hypervisor virtual switch 111 that employs a MAC address translation table 110 that serves to route the packet to the intended virtual machine. Various examples of a MAC address translation table 110 as well as techniques that serve to route the packet to the intended virtual machine are disclosed as pertains to the following FIG. 2A.

FIG. 2A presents MAC address translation table models 2A00 that are used to correlate cloud provider networking addresses to network-accessible entities in a virtualization system. As an option, one or more variations of MAC address translation table models 2A00 or any aspect thereof may be implemented in the context of the architecture and functionality of the embodiments described herein. The MAC address translation table models 2A00 or any aspect thereof may be implemented in any environment.

FIG. 2A illustrates aspects pertaining to maintaining cloud provider networking addresses that correlate to virtual machine networking addresses in a virtualization system. The figure is being presented with respect to its contribution to routing packets to one of many virtual machines that may be accessed through a particular virtual NIC of a virtualization system.

As shown in MAC address translation table $210_1$, each row correlates to a particular virtualization system entity. In a virtualization system such as is depicted in FIG. 1, each virtual machine is assigned a virtualization system media access control address. MAC address translation table $210_1$ depicts a correspondence between (1) a virtualization system media access control address that is assigned to a virtual machine and (2) a cloud provider's MAC address. For routing a packet from a particular vNIC at which the packet has arrived, the hypervisor virtual switch 111 (referring again to FIG. 1) accesses its MAC address translation table (MAT), looks up the row that contains the IP address of the intended virtual machine, and routes the packet to the intended virtual machine using the combination of the VM's IP address and the looked-up virtualization system MAC address.

The columnar organization of MAC lookup tables such as are depicted in FIG. 2A supports the scenario where there are multiple VMs that are accessed via a common vNIC. Specifically, since the columnar organization of the MAT table includes both (1) a cloud provider's IP address that is assigned to a virtual machine, and (2) a virtualization system media access control address that is assigned to the same virtual machine, a hypervisor virtual switch can use layer 2 switching to route a direct to the intended virtual machine. In some cases, and as shown, a MAT table may contain a virtual machine identifier. Such an identifier can be conveniently used for VM-level monitoring.

In many situations, a given node will support multiple virtual machines, and each virtual machine is assigned a particular virtualization system media access control address. However, it often happens that two or more of the virtual machines at a given node will be associated with a common vNIC. As such it can happen that several rows correlate to one particular node. This is shown in the depiction of MAC address translation table $210_2$. Specifically, while there is shown a one-to-one correspondence between a node and a vNIC (e.g., Node1 corresponds to vNIC1, Node2 corresponds to vNIC2, etc.) it is also shown that Node3 hosts two VMs, each of which are accessed through vNIC3. When routing a packet from a particular vNIC at which the packet has arrived, the hypervisor virtual switch 111 (referring again to FIG. 1) accesses its MAC address translation (MAT) table, looks up the row that contains the IP address of the intended virtual machine, and routes the packet to the intended virtual machine using the combination of the VM's IP address and the looked-up virtualization system MAC address. In this scenario, the packet is routed unambiguously to the correct VM using layer 2 switching.

The foregoing discussion of FIG. 2A discloses a MAC address table organization that serves to route a packet from a particular vNIC at a particular cloud provider's MAC address to a VM served by that vNIC. A different table with a different organization is needed within the cloud provider's networking fabric such that the cloud provider's networking fabric is able to route a packet from an external system to the correct vNIC. Such a table and discussion thereof are given as pertains to the FIG. 2B.

FIG. 2B presents a routing table model 2B00 that is used to route traffic to network-accessible entities in a virtualization system. As an option, one or more variations of routing table model 2B00 or any aspect thereof may be implemented in the context of the architecture and functionality of the embodiments described herein. The routing table model 2B00 or any aspect thereof may be implemented in any environment.

FIG. 2B illustrates organization of a routing table that is used to route a packet from an external system to a vNIC of a virtualization system. As shown, the routing table 112 has two columns: (1) a cloud provider IP address and (2) a cloud provider MAC address. Referring again to the API calls as discussed as pertains to FIG. 1, a particular one or more API calls are made from the virtualization system to the cloud provider. As earlier indicated, the API calls can be used to request and retrieve one or more network addresses that derive from the cloud provider's networking infrastructure. These addresses are (1) a cloud provider IP address, which is used to uniquely address a virtual machine, and (2) a cloud provider MAC address, which is used to uniquely address a vNIC. The shown routing table makes a correspondence between the two addresses by populating them into the same row. The tabular organization is merely illustrative and other techniques can be used to maintain the correspondence between the two addresses.

It must be noted that, regardless of the particular technique to maintain a particular correspondence between the MAC address and the IP address, there is a one-to-many correspondence where a single MAC address provided by the cloud provider needs to be mapped to many networking addresses corresponding to many VMs.

The foregoing discussions of FIG. 2A and FIG. 2B broach the concepts of outbound routing (e.g., routing of packets that originate from a VM) and inbound routing (e.g., routing of packets that are intended for a VM). Specific techniques using the correspondences that are captured in the foregoing data structures are discussed in further detail in FIG. 3A, FIG. 3B, FIG. 4A, and FIG. 4B.

Figure 3A:
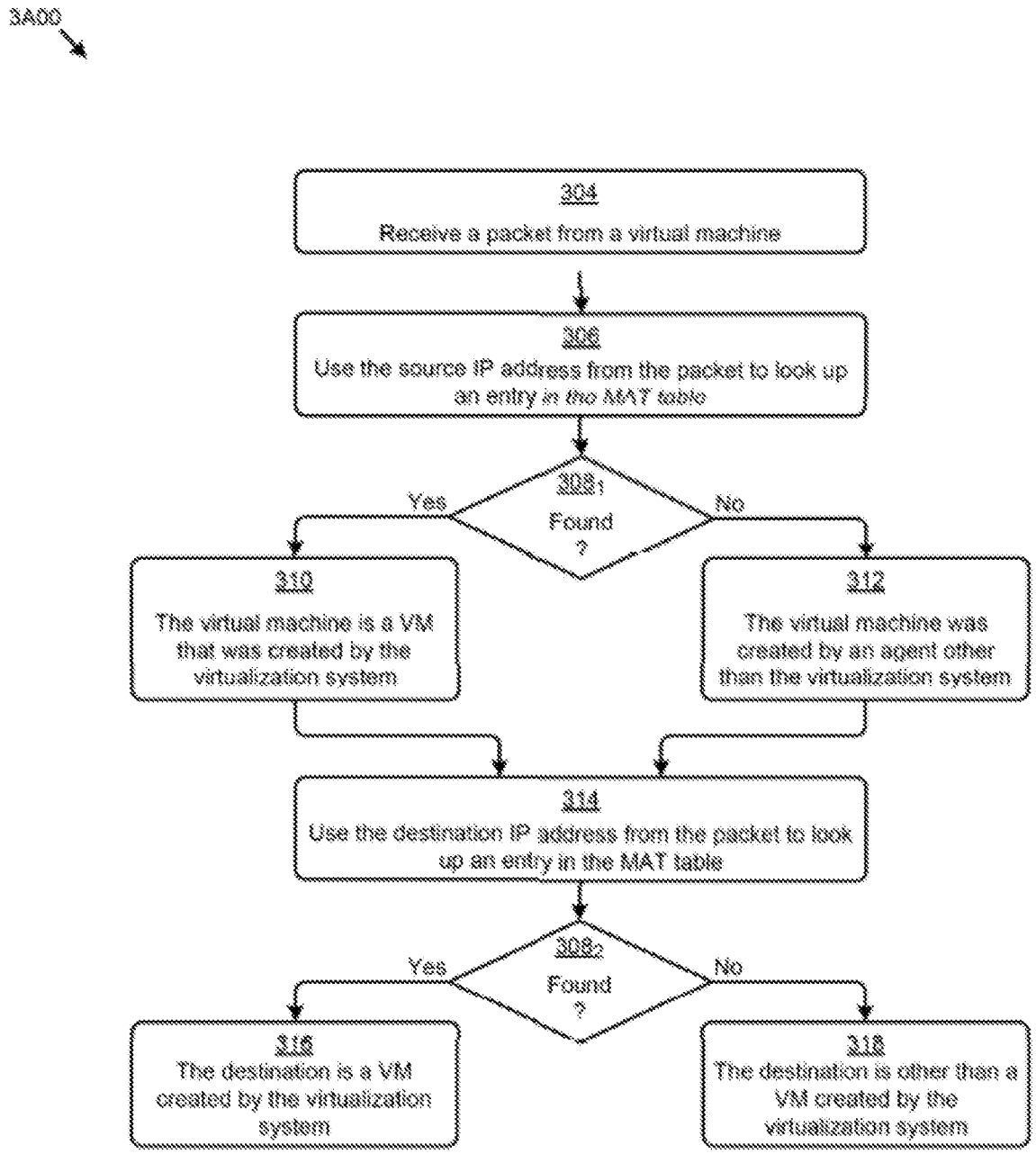
FIG. 3A is a flowchart depicting operations used in systems that correlate cloud provider networking addresses to network-accessible entities in a virtualization system, according to an embodiment.

FIG. 3A is a flowchart 3A00 depicting operations used in systems that correlate cloud provider networking addresses to network-accessible entities in a virtualization system. The figure is being presented to explain how a MAC address translation table can be used to determine whether or not a network accessible entity is a VM created by the virtualization system. This determination is needed since the MAC addresses of a VM created by the virtualization system are logical constructs that do not refer to actual hardware MAC addresses.

When a MAC address in a packet can be determined to be a MAC addresses of a VM created by the virtualization system, that MAC address can be translated to an actual hardware MAC address. More specifically, when a MAC address in a packet can be determined to be a MAC addresses of a VM created by the virtualization system, that MAC address can be translated to a cloud provider's media access control address. The depicted technique accesses a MAT table to determine whether the subject MAC address is a MAC address that was generated by the virtualization system when creating a virtual machine.

The flow is shown and discussed as pertains to outbound traffic. However, the technique can be used in any context to determine if a MAC address corresponds to a VM that was created by the virtualization system. The shown flow commences at step 304, upon receipt of a IP packet from a virtual machine. The IP packet contains a source IP address, a source MAC address, a destination IP address, and a destination MAC address. At step 306, the source IP address is used as a subject address to find a corresponding entry in the MAT table. If such an entry is found, the "Yes" branch of decision $308_1$ is taken, and the sender is thus known to be a VM that was created by the virtualization system (step 310). Otherwise, the "No" branch is taken, and the sender is known to be an entity that was not created by the virtualization system (at determination 312). Such a determination is used when substituting source MAC addresses. Specifics of source MAC address substitutions are further discussed as pertains to FIG. 3B.

There are many other ways to look up an entry in the MAT table. However, in the foregoing embodiments, even when there is a one-to-many relationship between a single MAC address (e.g., the MAC address of a vNIC) and multiple IP addresses (e.g., any number of virtual machines that are addressed through that vNIC), a lookup by IP address returns at most one MAT table entry.

Continuing this example flow, the foregoing technique to access a MAT table—to determine whether the subject MAC address is a MAC address that was generated by the virtualization system or not—can also be used with respect to destination MAC addresses. Specifically, at step 314, the destination IP address is used as a subject IP address to find a corresponding entry in the MAT table. If there is such an entry, the "Yes" branch of decision $308_2$ is taken, and the destination is thus known to be a VM that was created by the virtualization system (step 316). Otherwise, the "No" branch is taken, and the sender is known to be an entity that was not created by the virtualization system (at determination 318). Such a determination is used when substituting MAC addresses. Specifics of destination MAC address substitutions are further discussed as pertains to FIG. 3B.

Figure 3B:
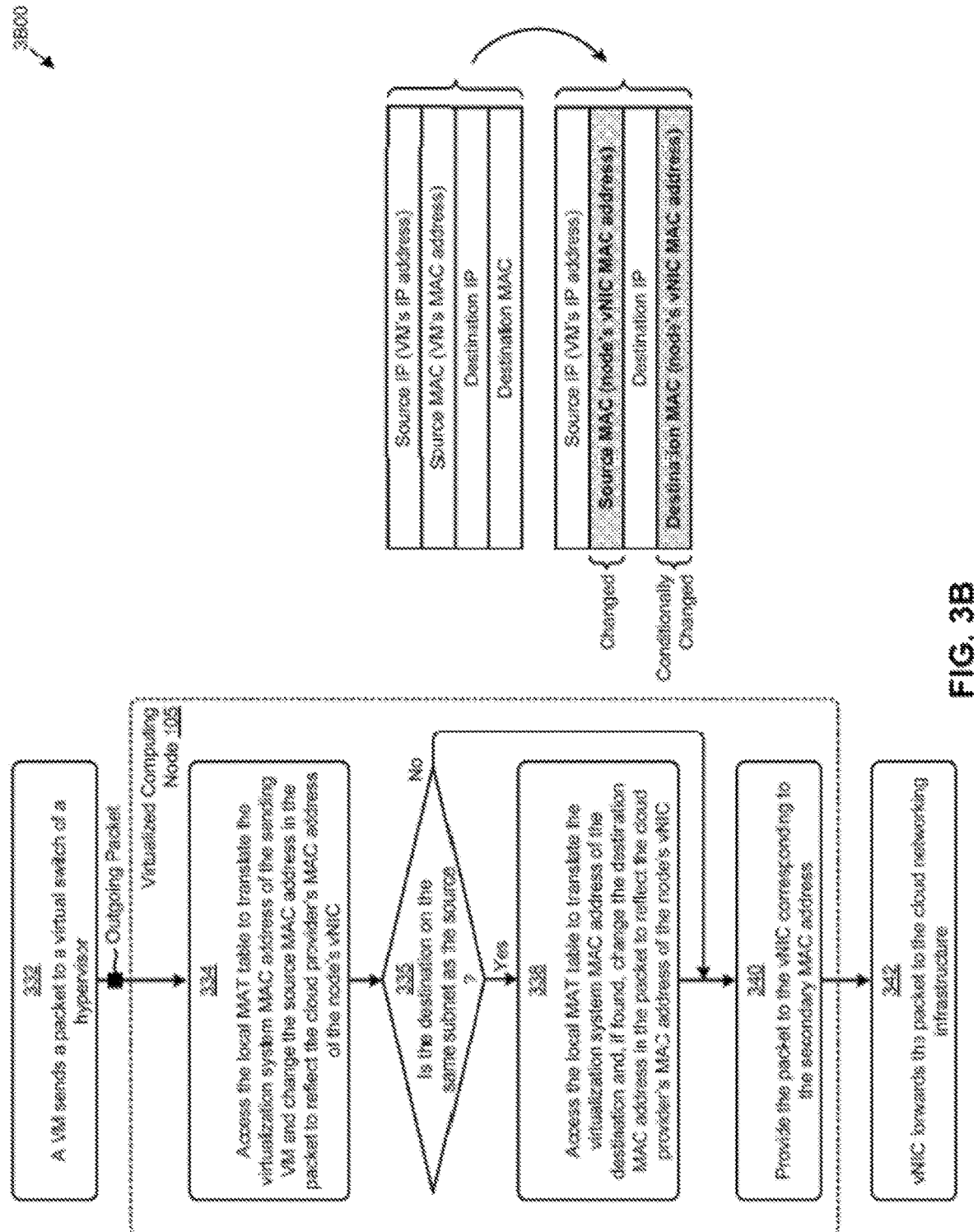
FIG. 3B illustrates example virtual switch operations performed over outbound network packets as used in systems that correlate cloud provider networking addresses to network-accessible entities in a virtualization system, according to an embodiment.

FIG. 3B illustrates example virtual switch operations 3B00 performed over outbound network packets as used in systems that correlate cloud provider networking addresses to network-accessible entities in a virtualization system. As an option, one or more variations of the virtual switch operations over outbound network packets or any aspect thereof may be implemented in the context of the architecture and functionality of the embodiments described herein. The virtual switch operations over outbound network packets or any aspect thereof may be implemented in any environment.

FIG. 3B illustrates aspects pertaining to routing of a packet that originates from a VM. Specifically, the figure and corresponding discussion show and describe how a packet is originally addressed and how it is modified by a virtual switch of a virtualized computing node.

The shown flow commences at step 332, upon the event that a virtual machine generates an outgoing packet and sends it to a virtual switch of a virtualized computing node. Such a packet includes a destination in the form of a destination IP address and a destination MAC address. The outgoing packet also includes the sender's addressing information—specifically the IP address of the sending VM and the MAC address of the sending VM—and the packet is presented to the virtual switch. The virtual switch then accesses its MAT table to translate the virtualization system MAC address into a cloud provider's MAC address. If the sending VM is a VM that was created by the virtualization system, then the sender's MAC address is translated from the VM's virtualization system MAC address (sometimes referred to herein as a "primary MAC address") to a corresponding cloud provider's MAC address (sometimes referred to herein as a "secondary MAC address"). This translation and change (step 334) is needed because the virtualization system MAC address is merely a logical construction of the virtualization system, whereas the corresponding cloud provider's MAC address is a MAC address of an actual interface to which packets can be routed from an external system.

Referring to decision 335 of FIG. 3A, if the sender and the destination are both on the same subnet, then the "Yes" branch is taken, and the destination MAC address is conditionally changed at step 338. Specifically, if the destination MAC address is found in the MAT table, then the outbound packet is modified to include the secondary vNIC address, which is a MAC address of an actual interface to which packets can be routed using the cloud provider's networking infrastructure. On the other hand, if the sender and the destination are not on the same subnet, then the "No" branch of decision 335 is taken, and the destination MAC address is not changed.

After the outgoing packet has been modified, the packet can then be provided (at step 340) by the virtual switch to the vNIC that is associated with the secondary MAC address. The vNIC in turn forwards the packet to the cloud networking infrastructure (at step 342), which in turn routes the packet onward towards its destination.

Figure 4A:
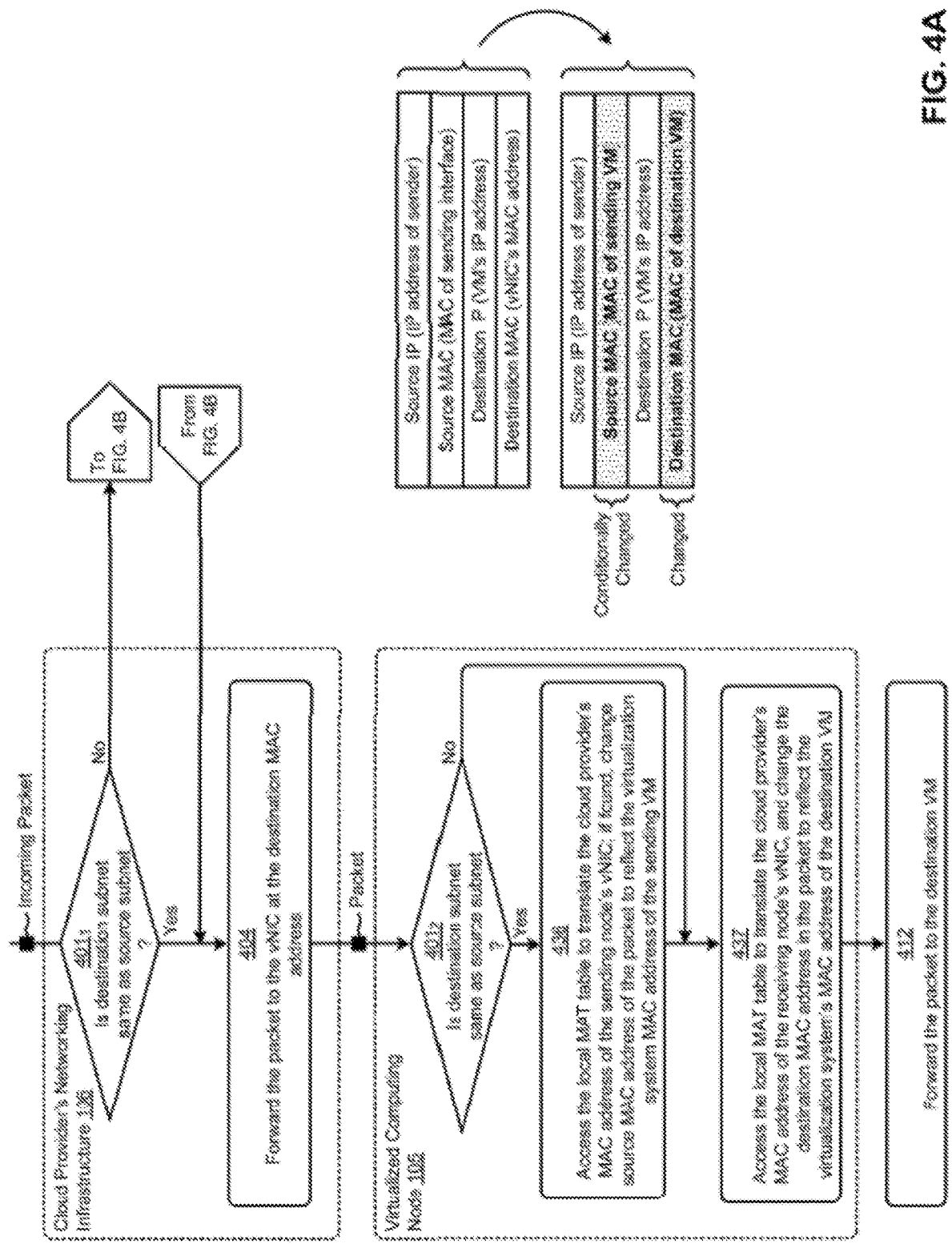
FIG. 4A and FIG. 4B illustrate an example context for virtualized computing node operations over inbound network packets as used in systems that correlate cloud provider networking addresses to network-accessible entities in a virtualization system, according to an embodiment.

FIG. 4A illustrates an example context for virtualized computing node operations over inbound network packets as used in systems that correlate cloud provider networking addresses to network-accessible entities in a virtualization system. As an option, one or more variations of virtualized computing node operations over inbound network packets or any aspect thereof may be implemented in the context of the architecture and functionality of the embodiments described herein. The virtualized computing node operations over inbound network packets or any aspect thereof may be implemented in any environment.

Figure 4B:
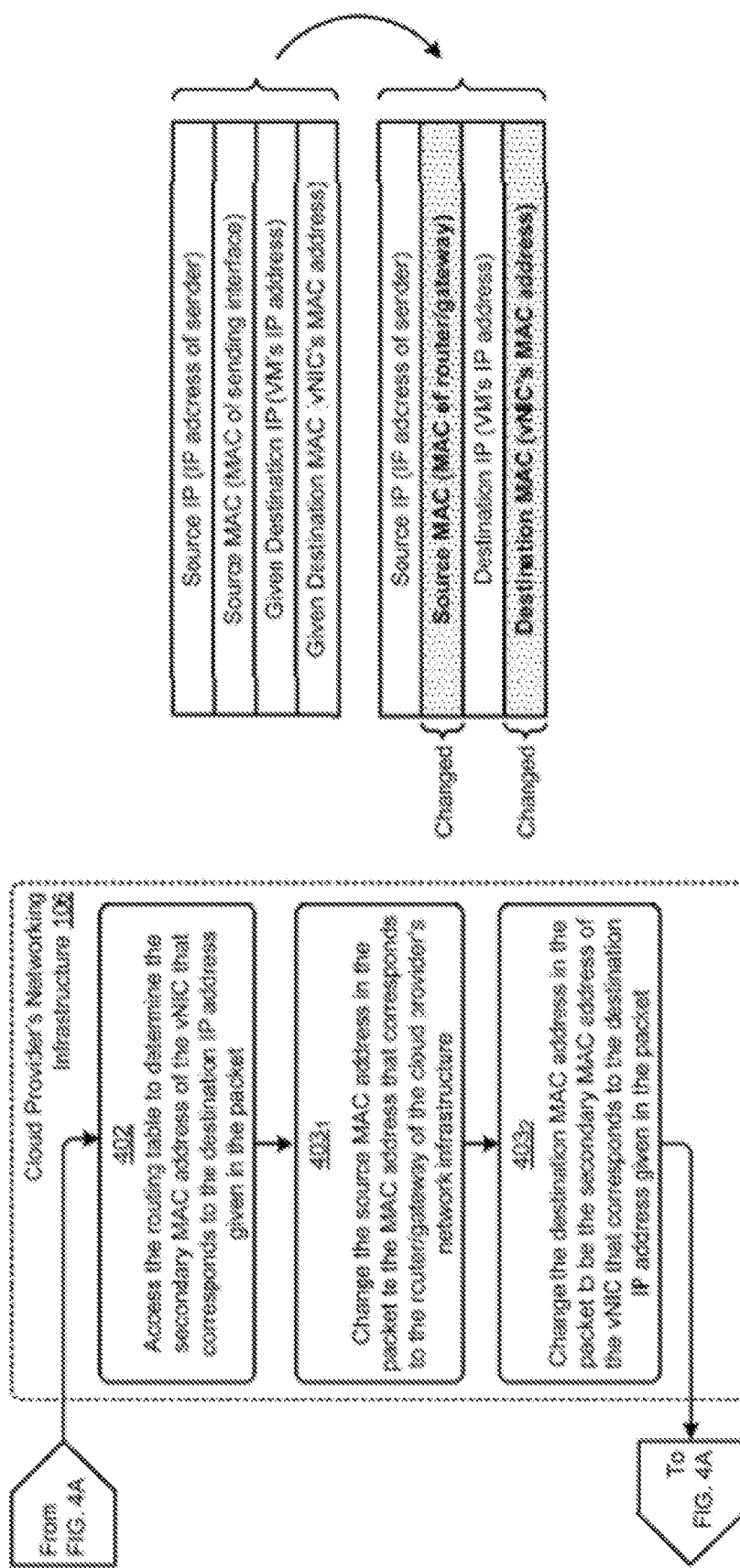

The shown flow begins when the cloud provider's networking infrastructure 106 receives an incoming packet, possibly from an external system or possibly from within the cloud provider's networking infrastructure itself. Regardless of the source of the packet, the packet is received at some networking device within the cloud provider's networking infrastructure and, at that point, a test is carried out to determine if the source and destination are on the same subnet. Decision 401₁ serves to route the flow based on the result of the test. Specifically, if the source and destination are not on the same subnet, then the "No" path is taken, and the steps of FIG. 4B are carried out. Otherwise, if the source and destination are on the same subnet, then the "Yes" path is taken, and the flow goes to step 404—without carrying out the steps of FIG. 4B.

At step 404 the packet has enough destination information in it to be routed to a vNIC that corresponds to the destination MAC address given in the packet, after which the packet is received at the virtualized computing node 105. The packet is again, in decision 401₂, subjected to a test to determine if the source and destination are on the same subnet. Decision 401₂ serves to route the flow based on the result of the test. Specifically, if the source and destination are on the same subnet, then the "Yes" path is taken, and step 436 is carried out to conditionally change the source MAC address to reflect the virtualization system MAC address of the sending VM. Otherwise, the "No" path is taken, and the flow goes to step 437, which translates the address from the cloud provider's vNIC MAC address to a virtualization system MAC address. The translated address is changed in the destination MAC address in the packet to reflect the virtualization system MAC address of the destination VM.

After making such changes to the address field(s) of the incoming packet, the modified packet now includes both the cloud provider's IP address of the VM (sometimes referred to herein as a secondary IP address or sometimes referred to herein as a preassigned IP address) as well as the virtualization system media access control address such that it can be forwarded (at step 412) to the VM.

FIG. 4B includes steps that are carried out by the cloud provider's networking infrastructure 106 so as to route traffic that might be destined for an entity of the virtualization system. As shown, at step 402, a routing table such as routing table 112 is accessed to determine the secondary MAC address of the vNIC that corresponds to the destination IP address. Using the information in the routing table, the destination vNIC can be determined. Next, the source MAC address in the packet is changed (step 403₁) to be the MAC address of the router/gateway of the cloud provider's networking infrastructure the determined destination vNIC. Also, the destination MAC address in the packet is changed to be the secondary MAC address of the vNIC that corresponds to the destination IP address given in the packet (step 403₂). The packet is then ready to be forwarded (step 404 of FIG. 4A) to the determined destination vNIC MAC address.

Figure 5:
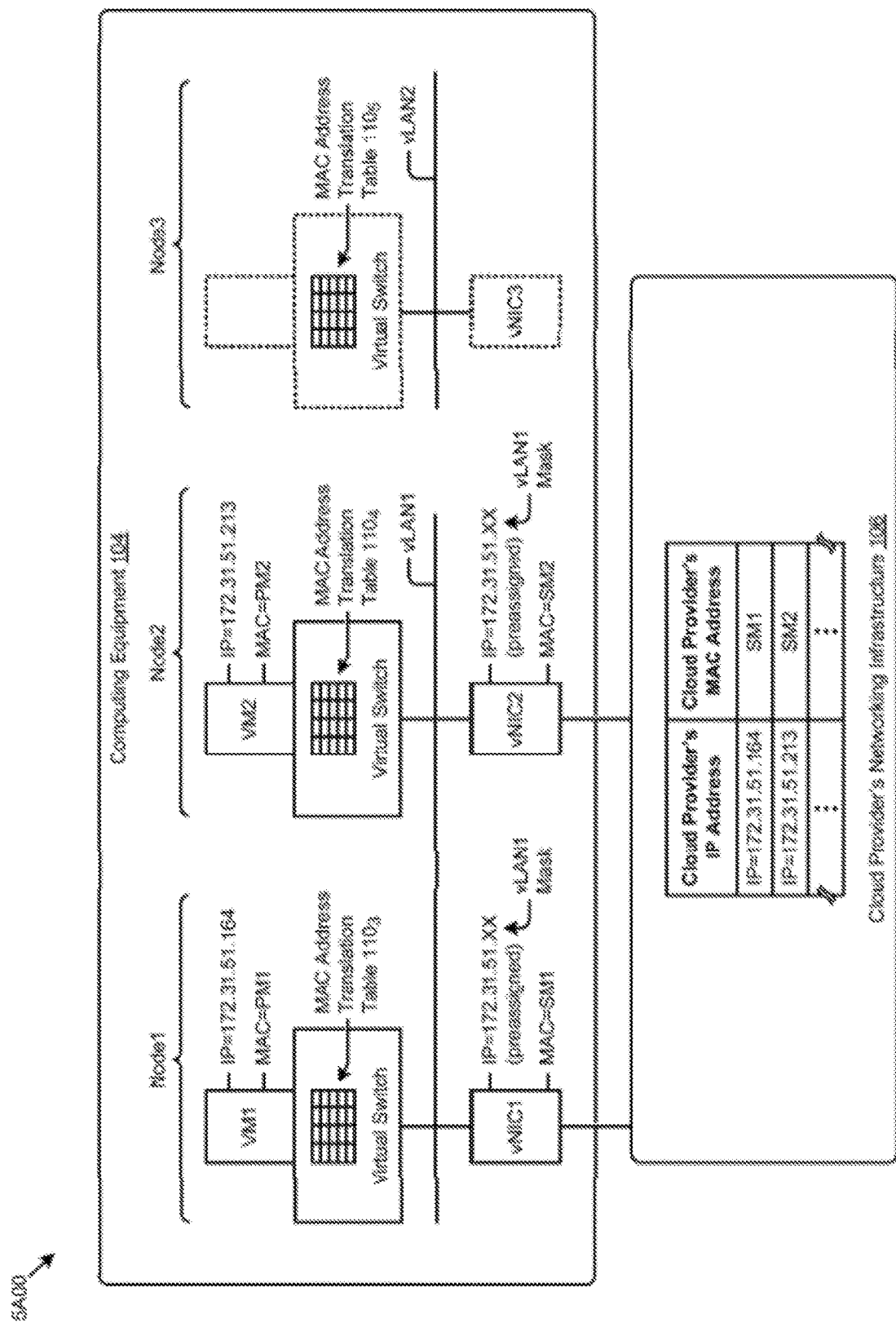
FIG. 5 illustrates an example vLAN formation technique as used in systems that correlate cloud provider networking addresses to network-accessible entities in a virtualization system, according to an embodiment.

FIG. 5 illustrates an example vLAN formation technique 5A00 as used in systems that correlate cloud provider networking addresses to network-accessible entities in a virtualization system. As an option, one or more variations of vLAN formation technique 5A00 or any aspect thereof may be implemented in the context of the architecture and functionality of the embodiments described herein. The vLAN formation technique 5A00 or any aspect thereof may be implemented in any environment.

FIG. 5 illustrates aspects pertaining to maintaining cloud provider networking addresses that correlate to virtual machine networking addresses in a virtualization system. Specifically, the figure is being presented with respect to its contribution to addressing the problem of forming and routing to virtual vLANs in a virtualization system.

As used herein a vLAN (virtual LAN) is a logical construction that groups together collections of virtual machines and other virtualized devices. VLANs are often formed to address functional and/or performance and/or security requirements of a virtualization system. VLANs can be used to provide security within a virtualization system by allowing a high degree of control over which virtualized devices have access to each other.

The example shown in FIG. 5 depicts how multiple nodes can share a particular VLAN (e.g., the shown vLAN1). The example of FIG. 5 also depicts how a second or Nth vLAN (e.g., vLAN2) can be formed.

As indicated above, a vLAN is a logical construction that groups together collections of virtual machines and other virtualized devices. FIG. 5 depicts this by showing that VM1 and VM2 are associated with vLAN1. In this illustrative example, the VM1 is access through vNIC1 and VM2 is accessed through vNIC2. Packets are routed to the correct vNIC since each vNIC is configured at a different secondary MAC address, and because each vNIC has an IP address and mask (e.g. a preassigned secondary IP address and VLAN mask). Specifically, a packet that is destined for IP address of 172.31.51.164 and MAC address of SM1 would be routed to and forwarded by vNIC1 because the IP address (after masking) and secondary MAC address both match. Similarly, a packet that is destined for IP address of 172.31.51.213 and secondary MAC address of SM2 would be routed to and forwarded by vNIC2 because the IP address (after masking) and MAC address both match.

When a packet arrives at the correct virtual node (e.g., Node1), that node's MAT table (e.g., MAC address translation table $110_3$) is accessed and the secondary MAC address (e.g., SM1) is translated into its corresponding primary MAC address (PM1) based on the destination IP address in the packet. This process is shown and described in step 436 and step 437 of FIG. 4A. The same process is used when a packet correctly arrives at Node2. Specifically, when a packet arrives at the correct virtual node (e.g., Node2), that node's MAT table (e.g., MAC address translation table $110_4$) is accessed and the secondary MAC address (e.g., SM2) is translated into its corresponding primary MAC address (PM2) based on the destination IP address in the packet.

Many virtualized system configurations are intended to support multiple tenants. In some cases, use of separate computing equipment and separate networking equipment serves to isolate one tenant from another tenant. However, this can lead to inefficiencies. One improved approach to isolate one tenant from another tenant is to assign a first set of virtualized computing entities (e.g., VMs) of a first tenant to interface to a first vLAN. Then, for a second tenant, assign a second set of virtualized computing entities (e.g., VMs) of a second tenant to interface to a second vLAN. As such, a virtualization system might need to create any number of vLANs to isolate the virtualized entities of a first tenant from the virtualized entities of a second tenant.

One mechanism for isolating the virtualized entities of a first tenant from the virtualized entities of a second tenant, while avoiding inefficiencies that arise from coarse equipment assignments is depicted in the example of FIG. 5. Although the example of FIG. 5 depicts only a second vLAN (e.g., vLAN2) a large number of vLANs can be formed for network communication between any number of computing entities that are operational on the computing equipment 104. Moreover, a large number of vLANs can be supported on a single node. More specifically, a single virtual node may support multiple disjoint sets of virtual machines (e.g., belonging to, or owned by different tenants), and each disjoint set can be associated with a different vLAN.

When forming a new vLAN, the virtualization system calls an API to request a pool of multiple IP addresses that correlate to a subnet of the cloud provider's networking infrastructure. More specifically, when requesting a pool of multiple IP addresses, each IP address returned will be an IP address that correlates to the cloud provider's MAC address of the subnet.

As an example, when forming new vLAN2, a separate vLAN from vLAN1, the virtualization system will form a new a MAC address translation table (MAC address translation table $110_5$) based an API call to request a pool of multiple IP addresses that correlate to a subnet of the cloud provider's networking infrastructure. More specifically, when forming new vLAN2, each IP address of the pool will be an IP address that correlates to the cloud provider's MAC address of a subnet that is different than the subnet of vLAN1.

Illustrative Embodiments to Implement Mappings Changes

In some networking environments, when relying on a cloud provider's networking infrastructure such as herein described, there may be limitations placed on certain protocols. For example, a particular cloud provider's networking infrastructure may disallow or otherwise limit use of broadcast or multicast operations. Unfortunately, such limitations on broadcast operations may adversely impact the usefulness of the address resolution protocol (ARP) in determining a MAC address for given IP address. Moreover, there may be applications that rely on multicast support in a given network, and the foregoing limits on multicast operations may adversely affect operation of such applications as well. However, even if the use of broadcast/multicast operations are disallowed, unicast-based address resolution protocols operations can be used instead.

Figure 6:
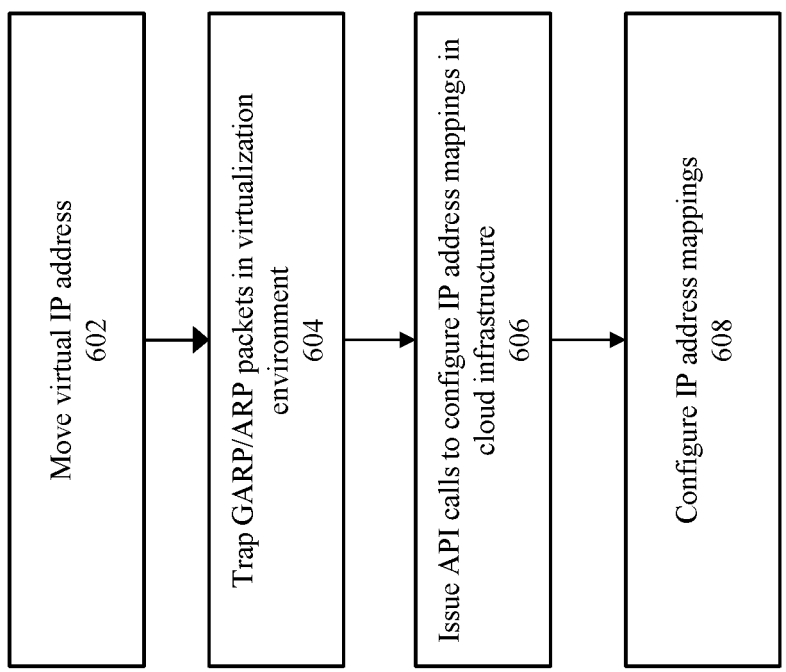
FIG. 6 shows a flowchart of an approach to automatically implement network mapping changes in bare metal cloud infrastructures that do not support adequate broadcast operations.

FIG. 6 shows a flowchart of an approach to automatically implement network mapping changes in bare metal cloud infrastructures that do not support adequate broadcast operations.

At step 602, the process begins when a floating/virtual IP address is moved from a first VM on a first node to a second VM on a second node. As discussed above, application and/or services running inside a virtual machine may choose to define additional IP addresses which are orchestrated outside the scope of the VM deployment. These IP addresses have been described as floating IP/virtual IP addresses, where such IP addresses may be served by more than one instance of the service/application running inside single/ multiple VMs, though at any point of time owned by a single service/application instance. The floating/virtual IP address needs to be associated with an owner service instance/VM MAC address. This binding may be dynamic in nature and varies as per service/application requirements.

Given that floating/virtual IP addresses do not have a fixed location, the network reachability of such addresses cannot be configured statically. To provide the cloud infrastructure reachability of Floating/Virtual IP addresses, one often needs to rely on events such as packets to/from the floating/ virtual IP address to derive the correct mapping.

VM workloads are typically characterized by a tuple comprising {MAC address, IP address}. On a layer 2 network, VMs learn this information from each other to form the appropriate MAC address and IP address mappings by sending ARP/GARP packets to each other. These MAC address and IP address mappings are used for VM reachability to each other. For the current embodiment of the bare metal virtualization environment, the VM IP addresses are configured in the underlying cloud infrastructure for reachability when VM workloads are deployed and/or powered ON.

In the context of floating/virtual IP addresses, when such virtual IP addresses are moved from one virtual machine to another, the appropriate ARP/GARP packets are generated to announce its current owner instance. This provides the most current MAC address to floating/virtual IP address mapping for the system.

At step 604, embodiments of the invention will trap the appropriate GARP/ARP packets after the movement of the virtual IP address and use the trapped packets to make the correct update to network mappings in the cloud infrastructure. This allows the current mapping of the floating/virtual IP address to be detected using the ARP/GARP packets sourced with the floating/virtual IP address. The IP address mappings should be updated both within the ARP caches of the VMs in the virtualization environment as well as at the networking metadata maintained by the cloud infrastructure.

The system traps the ARP/GARP packets closest to the source in order to provision its network reachability by configuring the underlying cloud infrastructure. In particular, the trapped packets are analyzed to identify the virtual IP address and the current VM that has issued the packets, from which the system is able to identify the specific node that hosts the VM and the node's associated cloud-provider MAC address. At step 606, one or more API calls can then be formulated to configure the reachability of the virtual IP address through the MAC address of the node that currently hosts the VM that is now associated with the virtual IP address.

Thereafter, at step 608, the IP mappings may be configured to reflect the updated mapping of the virtual IP address to the MAC address of the node that now hosts the VM having the virtual IP address. There are at least two locations where the IP mappings may need to be updated. One location includes the mapping table(s) in the infrastructure managed by the cloud provider. In addition, the IP mappings maintained by a virtual switch or router in the customer's virtualization environment may also be updated to reflect the new MAC address mapping for the virtual IP address.

The various ARP caches within the VMs in the virtualization environment may also be updated. With regards to the updates to the ARP caches within the VMs in the customer-maintained virtualization infrastructure, this action may be implemented using any suitable approach. Co-pending U.S. application Ser. No. 17/086,376, filed on even date herewith, which is hereby incorporated by reference in its entirety, discloses one possible approach that can be taken to update the ARP caches after movement of a virtual IP address.

Figure 7:
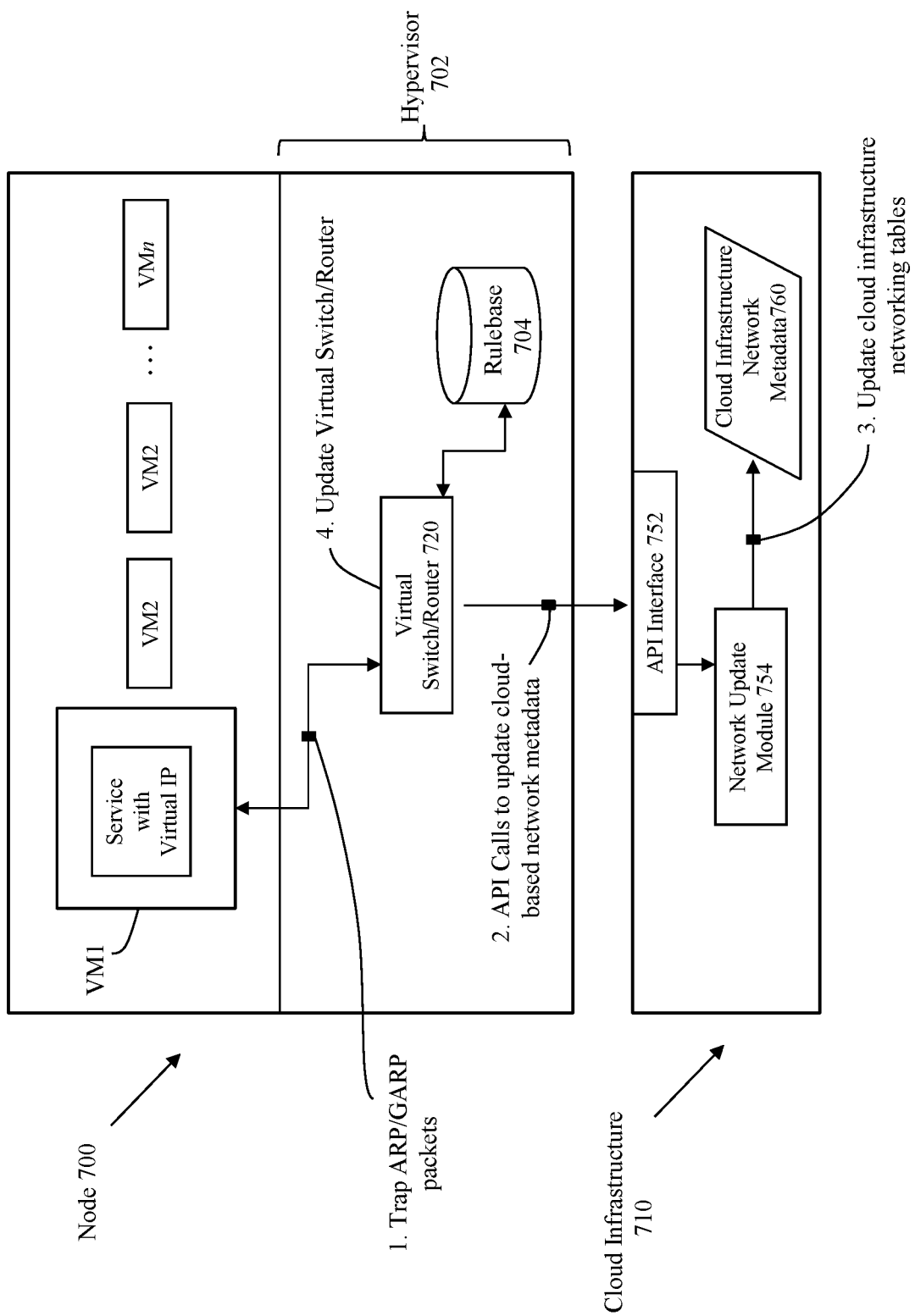
FIG. 7 illustrates additional details regarding an approach to implement some embodiments of the invention.

FIG. 7 illustrates additional details regarding an approach to implement some embodiments of the invention. This figure shows a node 700 within a virtualization environment that resides within a cloud infrastructure 710. The node 700 includes a hypervisor 702 that manages the operations of any number of virtual machines on node 700, such as VM1, VM2, VM3, . . . VMn.

Node 700 includes a virtual switch/router 720 configured within the hypervisor 702. When a virtual IP address is moved to a virtual machine on node 700, such as VM1, GARP packets may be sourced by VM1, which are used to associate the virtual IP address to VM1. In operation, the ARP request is flooded to all virtual machines of a given node (e.g., node 700), where each virtual machine of that given node will respond to the ARP request with an ARP reply that includes the IP address of the responding virtual machine as well as its primary (virtualization system assigned) MAC address. The ARP/GARP packets are transferred through the virtual switch/router 720 to perform these actions.

The virtual switch/router 720 will trap these packets, and operates to check one or more rules within rulebase 704 to determine if any additional actions need to be taken relative to the captured ARP/GARP packets. These rules can be generally be configured to address any type of captured broadcast packets to implement any suitable type of processing within the cloud infrastructure. In the current example, one or more rules are configured within rulebase 704 to specifically address the context of broadcast packets for virtual IP addresses. Specifically, when packets of the type for movement of a virtual IP address are identified, the configured rules within the rulebase indicate that the packets should be handled by the current mechanism to generate API calls for the cloud-based infrastructure, and correspond to identification the appropriate API calls to be made to effectuate the desired outcomes. As shown at step 2, the configured API calls having the correct arguments for desired virtual IP address mappings are then directed to the cloud infrastructure.

The cloud infrastructure 710 includes an API interface 752 to receive API calls. The API calls issued by the hypervisor 702 are directed to the API interface 752 within the cloud infrastructure 710. The received API calls are processed by a network update module 754 to update one or more mappings within the cloud infrastructure network metadata 760. For example, one or more routing tables may be updated within the cloud infrastructure network metadata 760 to reflect an association of the virtual IP address to the MAC address for the node 700 that hosts the VM1 having the virtual IP address. One or more MAC address tables and/or entries within the MAC address tables may be changed to reflect the new mappings.

At step 4, one or more routing tables may also be updated within the virtualization environment as well to reflect the new association of the virtual IP address to the MAC address for the node 700. In the current embodiment, this action may take the form of an update to one or more routing/mapping tables maintained by the virtual switch/router 720.

Therefore, what has been described is an improved approach for managing floating/virtual IP addresses in a virtualization system. With embodiments of the current approach, floating/virtual IP addresses can be supported on any substrate in real time while incurring minimal traffic disruption.

System Architecture Overview

Additional System Architecture Examples

Figure 8A:
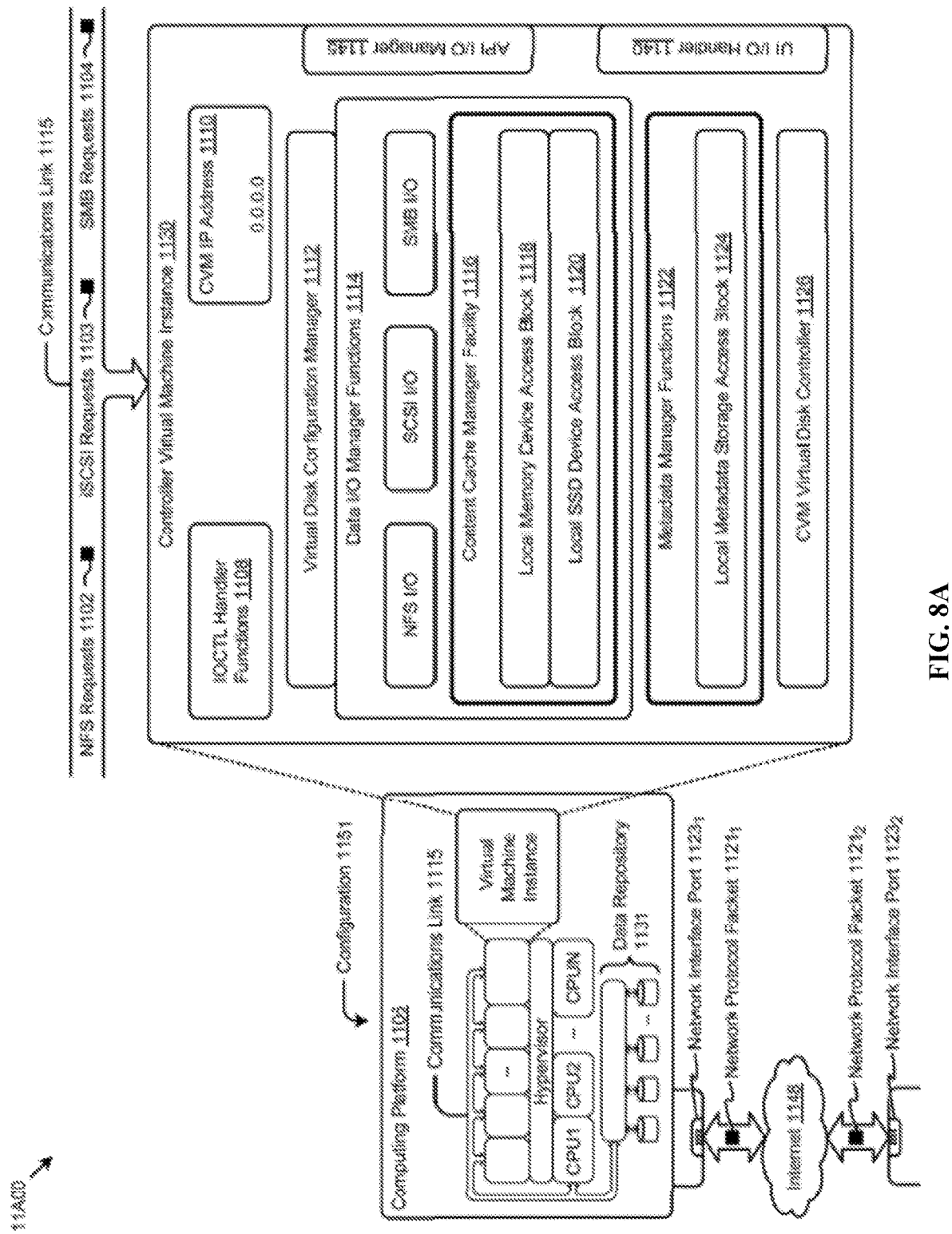
FIG. 8A, FIG. 8B, and FIG. 8C depict virtualized controller architectures comprising collections of interconnected components suitable for implementing embodiments of the present disclosure and/or for use in the herein-described environments.

FIG. 8A depicts a controller virtual machine as implemented in the shown virtual machine architecture 11A00. The heretofore-disclosed embodiments, including variations of any virtualized systems using any variations of virtualized controllers, can be implemented in distributed systems where a plurality of networked-connected devices communicate and coordinate actions using inter-component messaging. Distributed systems are systems of interconnected components that are designed for, or dedicated to, storage operations as well as being designed for, or dedicated to, computing and/or networking operations. Interconnected components in a distributed system can operate cooperatively to achieve a particular objective such as to provide high-performance computing, high-performance networking capabilities, and/or high-performance storage and/or high-capacity storage capabilities. For example, a first set of components of a distributed computing system can coordinate to efficiently use a set of computational or compute resources, while a second set of components of the same distributed computing system can coordinate to efficiently use the same or a different set of data storage facilities.

A hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

Physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

As shown, virtual machine architecture 11A00 comprises a collection of interconnected components suitable for implementing embodiments of the present disclosure and/or for use in the herein-described environments. Moreover, virtual machine architecture 11A00 includes a virtual machine instance in configuration 1151 that is further described as pertaining to controller virtual machine instance 1130. Configuration 1151 supports virtual machine instances that are deployed as user virtual machines, or controller virtual machines or both. Such virtual machines interface with a hypervisor (as shown). Some virtual machines include processing of storage I/O (input/output or IO) as received from any or every source within the computing platform. An example implementation of such a virtual machine that processes storage I/O is depicted as 1130.

In this and other configurations, a controller virtual machine instance receives block I/O storage requests as network file system (NFS) requests in the form of NFS requests 1102, and/or internet small computer storage interface (iSCSI) block IO requests in the form of iSCSI requests 1103, and/or Samba file system (SMB) requests in the form of SMB requests 1104. The controller virtual machine (CVM) instance publishes and responds to an internet protocol (IP) address (e.g., CVM IP address 1110). Various forms of input and output can be handled by one or more IO control handler functions (e.g., IOCTL handler functions 1108) that interface to other functions such as data IO manager functions 1114 and/or metadata manager functions 1122. As shown, the data IO manager functions can include communication with virtual disk configuration manager 1112 and/or can include direct or indirect communication with any of various block IO functions (e.g., NFS IO, iSCSI IO, SMB IO, etc.).

In addition to block IO functions, configuration 1151 supports IO of any form (e.g., block IO, streaming IO, packet-based IO, HTTP traffic, etc.) through either or both of a user interface (UI) handler such as UI IO handler 1140 and/or through any of a range of application programming interfaces (APIs), possibly through API IO manager 1145.

Communications link 1115 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry may be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as hard disk drives (HDDs) or hybrid disk drives, or random access persistent memories (RAPMs) or optical or magnetic media drives such as paper tape or magnetic tape drives. Volatile media includes dynamic memory such as random access memory. As shown, controller virtual machine instance 1130 includes content cache manager facility 1116 that accesses storage locations, possibly including local dynamic random access memory (DRAM) (e.g., through local memory device access block 1118) and/or possibly including accesses to local solid state storage (e.g., through local SSD device access block 1120).

Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of data repository 1131, which in turn can be formatted into any one or more storage areas, and which can comprise parameterized storage accessible by a key (e.g., a filename, a table name, a block address, an offset address, etc.). Data repository 1131 can store any forms of data, and may comprise a storage area dedicated to storage of metadata pertaining to the stored forms of data. In some cases, metadata can be divided into portions. Such portions and/or cache copies can be stored in the storage data repository and/or in a local storage area (e.g., in local DRAM areas and/or in local SSD areas). Such local storage can be accessed using functions provided by local metadata storage access block 1124. The data repository 1131 can be configured using CVM virtual disk controller 1126, which can in turn manage any number or any configuration of virtual disks.

Execution of a sequence of instructions to practice certain embodiments of the disclosure are performed by one or more instances of a software instruction processor, or a processing element such as a data processor, or such as a central processing unit (e.g., CPU1, CPU2, . . . , CPUN). According to certain embodiments of the disclosure, two or more instances of configuration 1151 can be coupled by communications link 1115 (e.g., backplane, LAN, PSTN, wired or wireless network, etc.) and each instance may perform respective portions of sequences of instructions as may be required to practice embodiments of the disclosure.

The shown computing platform 1106 is interconnected to the Internet 1148 through one or more network interface ports (e.g., network interface port $1123_1$ and network interface port $1123_2$). Configuration 1151 can be addressed through one or more network interface ports using an IP address. Any operational element within computing platform 1106 can perform sending and receiving operations using any of a range of network protocols, possibly including network protocols that send and receive packets (e.g., network protocol packet $1121_1$ and network protocol packet $1121_2$).

Computing platform 1106 may transmit and receive messages that can be composed of configuration data and/or any other forms of data and/or instructions organized into a data structure (e.g., communications packets). In some cases, the data structure includes program instructions (e.g., application code) communicated through the Internet 1148 and/or through any one or more instances of communications link 1115. Received program instructions may be processed and/or executed by a CPU as it is received and/or program instructions may be stored in any volatile or non-volatile storage for later execution. Program instructions can be transmitted via an upload (e.g., an upload from an access device over the Internet 1148 to computing platform 1106). Further, program instructions and/or the results of executing program instructions can be delivered to a particular user via a download (e.g., a download from computing platform 1106 over the Internet 1148 to an access device).

Configuration 1151 is merely one sample configuration. Other configurations or partitions can include further data processors, and/or multiple communications interfaces, and/or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (e.g., LAN or virtual LAN (vLAN)) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to other units. In some cases, a unit in a rack is dedicated to environmental conditioning functions such as filtering and movement of air through the rack and/or temperature control for the rack. Racks can be combined to form larger clusters. For example, the LAN of a first rack having a quantity of 32 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or a LAN (e.g., when geographically proximal).

As used herein, a module can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to facilitate operational and/or performance characteristics pertaining to correlation of cloud provider networking addresses to network-accessible entities in a virtualization system. In some embodiments, a module may include one or more state machines and/or combinational logic used to implement or facilitate the operational and/or performance characteristics pertaining to correlation of cloud provider networking addresses to network-accessible entities in a virtualization system.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of correlation of cloud provider networking addresses to network-accessible entities in a virtualization system). Such files or records can be brought into and/or stored in volatile or non-volatile memory. More specifically, the occurrence and organization of the foregoing files, records, and data structures improve the way that the computer stores and retrieves data in memory, for example, to improve the way data is stored and accessed when the computer is performing operations pertaining to correlation of cloud provider networking addresses to network-accessible entities in a virtualization system, and/or for improving the way data is manipulated when performing computerized operations pertaining to maintaining cloud provider networking addresses that correlate to virtual machine networking addresses in a virtualization system.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT", issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING A MAINTENANCE SERVICE FOR MANAGING I/O AND STORAGE FOR A VIRTUALIZATION ENVIRONMENT", issued on Oct. 1, 2013, which is hereby incorporated by reference in its entirety.

Figure 8B:
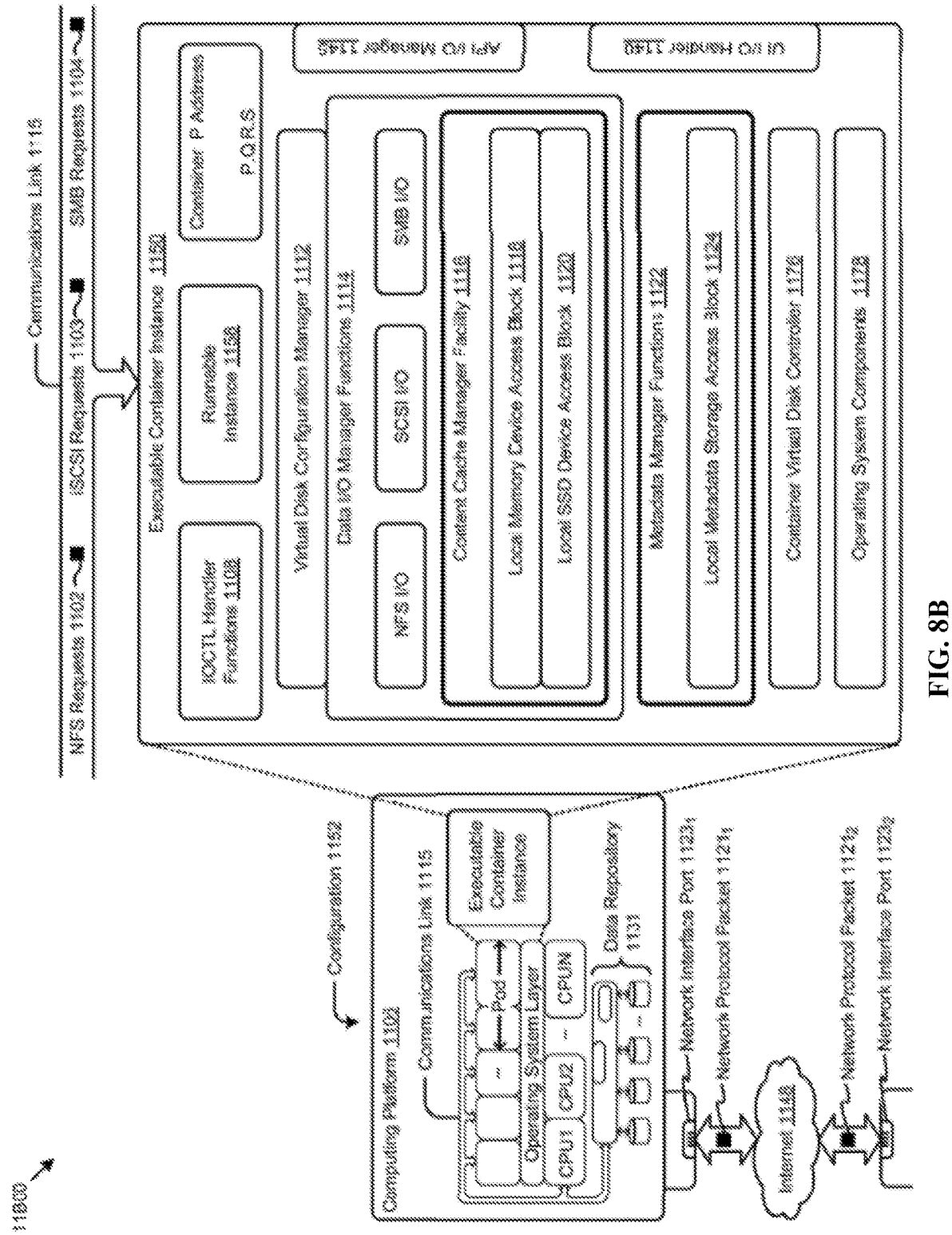

FIG. 8B depicts a virtualized controller implemented by containerized architecture 11B00. The containerized architecture comprises a collection of interconnected components suitable for implementing embodiments of the present disclosure and/or for use in the herein-described environments. Moreover, the shown containerized architecture 11B00 includes an executable container instance in configuration 1152 that is further described as pertaining to executable container instance 1150. Configuration 1152 includes an operating system layer (as shown) that performs addressing functions such as providing access to external requestors (e.g., user virtual machines or other processes) via an IP address (e.g., "P.Q.R.S", as shown). Providing access to external requestors can include implementing all or portions of a protocol specification (e.g., "http:") and possibly handling port-specific functions. In this and other embodiments, external requestors (e.g., user virtual machines or other processes) rely on the aforementioned addressing functions to access a virtualized controller for performing all data storage functions. Furthermore, when data input or output requests are received from a requestor running on a first node are received at the virtualized controller on that first node, then in the event that the requested data is located on a second node, the virtualized controller on the first node accesses the requested data by forwarding the request to the virtualized controller running at the second node. In some cases, a particular input or output request might be forwarded again (e.g., an additional or Nth time) to further nodes. As such, when responding to an input or output request, a first virtualized controller on the first node might communicate with a second virtualized controller on the second node, which second node has access to particular storage devices on the second node or, the virtualized controller on the first node may communicate directly with storage devices on the second node.

The operating system layer can perform port forwarding to any executable container (e.g., executable container instance 1150). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and may include any dependencies therefrom. In some cases, a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a respective virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance (e.g., a Docker container instance) can serve as an instance of an application container or as a controller executable container. Any executable container of any sort can be rooted in a directory system, and can be configured to be accessed by file system commands (e.g., "ls" or "ls-a", etc.). The executable container might optionally include operating system components 1178, however such a separate set of operating system components need not be provided. As an alternative, an executable container can include runnable instance 1158, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, container virtual disk controller 1176. Such a container virtual disk controller can perform any of the functions that the aforementioned CVM virtual disk controller 1126 can perform, yet such a container virtual disk controller does not rely on a hypervisor or any particular operating system so as to perform its range of functions.

In some environments, multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 8C:
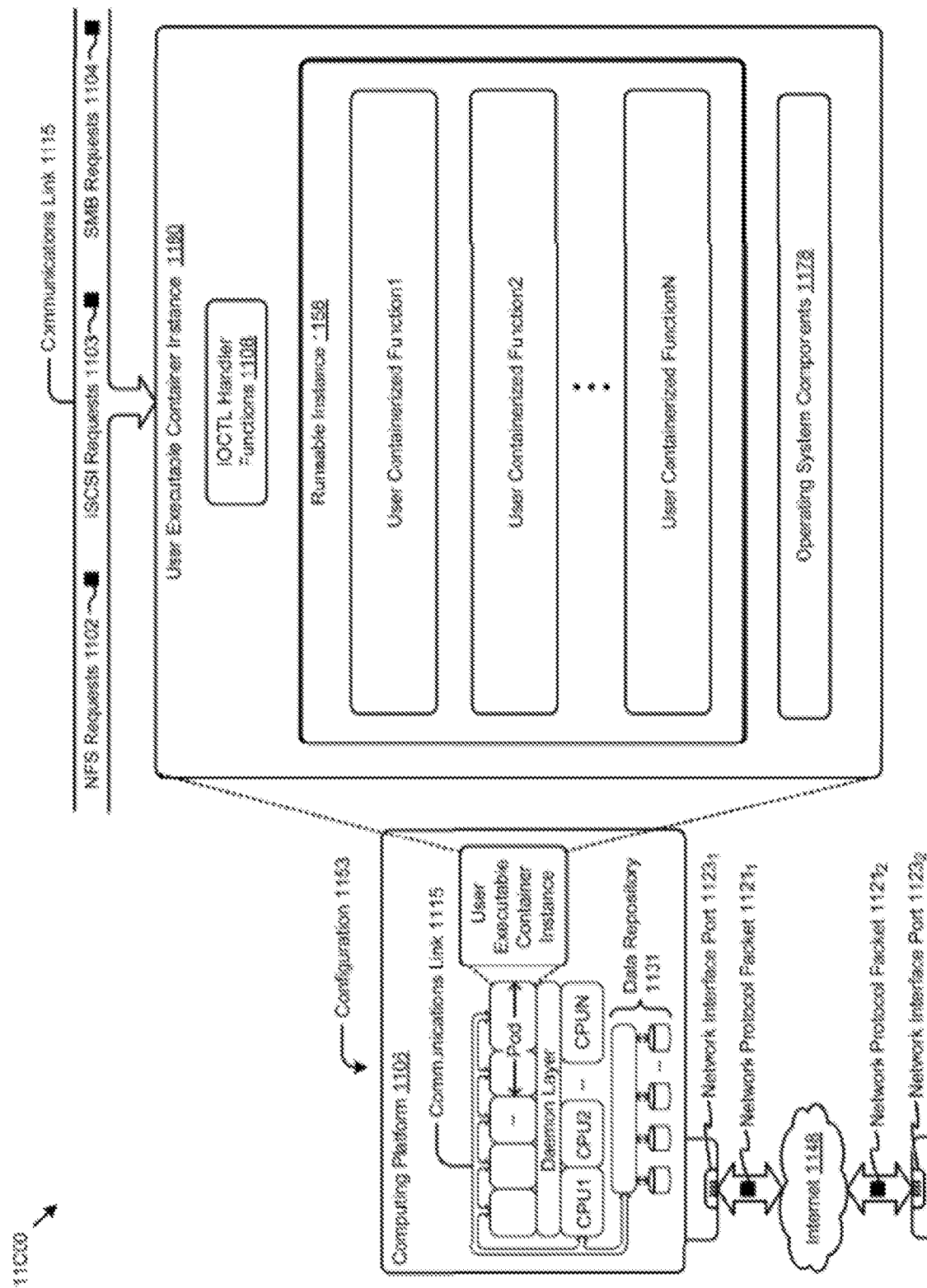

FIG. 8C depicts a virtualized controller implemented by a daemon-assisted containerized architecture 11C00. The containerized architecture comprises a collection of interconnected components suitable for implementing embodiments of the present disclosure and/or for use in the herein-described environments. Moreover, the shown daemon-assisted containerized architecture includes a user executable container instance in configuration 1153 that is further described as pertaining to user executable container instance 1180. Configuration 1153 includes a daemon layer (as shown) that performs certain functions of an operating system.

User executable container instance 1180 comprises any number of user containerized functions (e.g., user containerized function1, user containerized function2, . . . , user containerized functionN). Such user containerized functions can execute autonomously or can be interfaced with or wrapped in a runnable object to create a runnable instance (e.g., runnable instance 1158). In some cases, the shown operating system components 1178 comprise portions of an operating system, which portions are interfaced with or included in the runnable instance and/or any user containerized functions. In this embodiment of a daemon-assisted containerized architecture, the computing platform 1106 might or might not host operating system components other than operating system components 1178. More specifically, the shown daemon might or might not host operating system components other than operating system components 1178 of user executable container instance 1180.

The virtual machine architecture 11A00 of FIG. 11A and/or the containerized architecture 11B00 of FIG. 11B and/or the daemon-assisted containerized architecture 11C00 of FIG. 11C can be used in any combination to implement a distributed platform that contains multiple servers and/or nodes that manage multiple tiers of storage where the tiers of storage might be formed using the shown data repository 1131 and/or any forms of network accessible storage. As such, the multiple tiers of storage may include storage that is accessible over communications link 1115. Such network accessible storage may include cloud storage or networked storage (e.g., a SAN or storage area network). Unlike prior approaches, the presently-discussed embodiments permit local storage that is within or directly attached to the server or node to be managed as part of a storage pool. Such local storage can include any combinations of the aforementioned SSDs and/or HDDs and/or RAPMs and/or hybrid disk drives. The address spaces of a plurality of storage devices, including both local storage (e.g., using node-internal storage devices) and any forms of network-accessible storage, are collected to form a storage pool having a contiguous address space.

Significant performance advantages can be gained by allowing the virtualization system to access and utilize local (e.g., node-internal) storage. This is because I/O performance is typically much faster when performing access to local storage as compared to performing access to networked storage or cloud storage. This faster performance for locally attached storage can be increased even further by using certain types of optimized local storage devices such as SSDs or RAPMs, or hybrid HDDs, or other types of high-performance storage devices.

In example embodiments, each storage controller exports one or more block devices or NFS or iSCSI targets that appear as disks to user virtual machines or user executable containers. These disks are virtual since they are implemented by the software running inside the storage controllers. Thus, to the user virtual machines or user executable containers, the storage controllers appear to be exporting a clustered storage appliance that contains some disks. User data (including operating system components) in the user virtual machines resides on these virtual disks.

Any one or more of the aforementioned virtual disks (or "vDisks") can be structured from any one or more of the storage devices in the storage pool. As used herein, the term "vDisk" refers to a storage abstraction that is exposed by a controller virtual machine or container to be used by another virtual machine or container. In some embodiments, the vDisk is exposed by operation of a storage protocol such as iSCSI or NFS or SMB. In some embodiments, a vDisk is mountable. In some embodiments, a vDisk is mounted as a virtual storage device.

In example embodiments, some or all of the servers or nodes run virtualization software. Such virtualization software might include a hypervisor (e.g., as shown in configuration 1151 of FIG. 11A) to manage the interactions between the underlying hardware and user virtual machines or containers that run client software.

Distinct from user virtual machines or user executable containers, a special controller virtual machine (e.g., as depicted by controller virtual machine instance 1130) or as a special controller executable container is used to manage certain storage and I/O activities. Such a special controller virtual machine is referred to as a "CVM", or as a controller executable container, or as a service virtual machine (SVM), or as a service executable container, or as a storage controller. In some embodiments, multiple storage controllers are hosted by multiple nodes. Such storage controllers coordinate within a computing system to form a computing cluster.

The storage controllers are not formed as part of specific implementations of hypervisors. Instead, the storage controllers run above hypervisors on the various nodes and work together to form a distributed system that manages all of the storage resources, including the locally attached storage, the networked storage, and the cloud storage. In example embodiments, the storage controllers run as special virtual machines-above the hypervisors-thus, the approach of using such special virtual machines can be used and implemented within any virtual machine architecture. Furthermore, the storage controllers can be used in conjunction with any hypervisor from any virtualization vendor and/or implemented using any combinations or variations of the aforementioned executable containers in conjunction with any host operating system components.

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A non-transitory computer readable medium having stored thereon a sequence of instructions which, when stored in memory and executed by a processor cause the processor to perform acts, comprising:

receiving, at a first node, a broadcast packet from a virtual machine on the first node in a virtualization environment, the virtualization environment being implemented on a bare metal cloud infrastructure comprising the first node and a second node, the first and second nodes being connected by a cloud-provided networking infrastructure;

trapping the broadcast packet at the first node; and processing the trapped broadcast packet by:

generating, at the first node, an API (application programming interface) call based on the broadcast packet, wherein the broadcast packet comprises an ARP (address resolution protocol) or GARP (gratuitous ARP) packet that corresponds to movement of a virtual IP (internet protocol) address from a first virtual machine on the first node to a second virtual machine on the second node;

directing the API call from the first node to update network metadata in the bare metal cloud infrastructure that maps the virtual IP address to a MAC (media access control) address associated with the second virtual machine; and updating a mapping of the virtual IP address to the MAC address associated with the second virtual machine at a virtual switch or a virtual router at the second node.

2. The non-transitory computer readable medium of claim 1, wherein the trapped broadcast packet comprising the ARP or GARP packet is disallowed or limited on the cloud-provided networking infrastructure.

3. The non-transitory computer readable medium of claim 1, wherein updating the mapping of the virtual IP address to the MAC address associated with the second virtual machine at the virtual switch or the virtual router at the second node comprises updating at least one of a routing table or MAC address table to map the virtual IP address to the MAC address associated with the second virtual machine.

4. The non-transitory computer readable medium of claim 1, wherein the broadcast packet is from the virtualization environment that is implemented on the bare metal cloud infrastructure.

5. The non-transitory computer readable medium of claim 4, wherein the broadcast packet is generated by a virtual machine in the virtualization environment that is implemented on the bare metal cloud infrastructure.

6. The non-transitory computer readable medium of claim 1, wherein the virtual switch or virtual router within a hypervisor of the virtualization environment traps the broadcast packet and generates the API call and the virtual switch or the virtual router operates by checking against a rule in a rulebase to determine the API call.

7. The non-transitory computer readable medium of claim 1, wherein:
the bare metal cloud infrastructure and additional bare metal cloud infrastructures are provided by a cloud provider to multiple customers and interconnected using the cloud-provided networking infrastructure,
the cloud-provided networking infrastructure includes an API coupled to a network update module that updates a set of cloud infrastructure network metadata comprising mappings between virtual IP addresses assigned to respective virtual machines and MAC addresses assigned to respective nodes in response to receipt of API calls at the API, and
the bare metal cloud infrastructures are accessible from corresponding user stations coupled to the bare metal cloud infrastructures on a network.

8. The non-transitory computer readable medium of claim 1, wherein the MAC address corresponds to a vNIC (virtual network interface card) that is associated with a virtual node that hosts the second virtual machine.

9. A method comprising:
receiving, at a first node, a broadcast packet from a virtual machine on the first node in a virtualization environment, the virtualization environment being implemented on a bare metal cloud infrastructure comprising the first node and a second node, the first and second nodes being connected by a cloud-provided networking infrastructure;
trapping the broadcast packet at the first node; and
processing the trapped broadcast packet by:
generating, at the first node, an API (application programming interface) call based on the broadcast packet, wherein the broadcast packet comprises an ARP (address resolution protocol) or GARP (gratuitous ARP) packet that corresponds to movement of a virtual IP (internet protocol) address from a first virtual machine on the first node to a second virtual machine on the second node;
directing the API call from the first node to update network metadata in the bare metal cloud infrastructure that maps the virtual IP address to a MAC (media access control) address associated with the second virtual machine; and
updating a mapping of the virtual IP address to the MAC address associated with the second virtual machine at a virtual switch or a virtual router at the second node.

10. The method of claim 9, wherein the virtual switch or virtual router within a hypervisor of the virtualization environment traps the broadcast packet and generates the API call and the virtual switch or the virtual router operates by checking against a rule in a rulebase to determine the API call.

11. The method of claim 9, wherein:
the bare metal cloud infrastructure and additional bare metal cloud infrastructures are provided by a cloud provider to multiple customers and interconnected using the cloud-provided networking infrastructure,
the cloud-provided networking infrastructure includes an API coupled to a network update module that updates a set of cloud infrastructure network metadata comprising mappings between virtual IP addresses assigned to respective virtual machines and MAC addresses assigned to respective nodes in response to receipt of API calls at the API, and
the bare metal cloud infrastructures are accessible from corresponding user stations coupled to the bare metal cloud infrastructures on a network.

12. The method of claim 9, wherein the trapped broadcast packet comprising the ARP or GARP packet is disallowed or limited on the cloud-provided networking infrastructure.

13. The method of claim 9, wherein updating the mapping of the virtual IP address to the MAC address associated with the second virtual machine at the virtual switch or the virtual router at the second node comprises updating at least one of a routing table or MAC address table to map the virtual IP address to the MAC address associated with the second virtual machine.

14. The method of claim 9, wherein the MAC address corresponds to a vNIC (virtual network interface card) that is associated with a virtual node that hosts the second virtual machine.

15. The method of claim 9, wherein the broadcast packet is from the virtualization environment that is implemented on the bare metal cloud infrastructure.

16. The method of claim 15, wherein the broadcast packet is generated by a virtual machine in the virtualization environment that is implemented on the bare metal cloud infrastructure.

17. A system comprising:
a storage medium having stored thereon a sequence of instructions; and
a processor that executes the sequence of instructions to cause the processor to perform acts comprising:
receiving, at a first node, a broadcast packet from a virtual machine on the first node in a virtualization environment, the virtualization environment being implemented on a bare metal cloud infrastructure comprising the first node and a second node, the first and second nodes being connected by a cloud-provided networking infrastructure;
trapping the broadcast packet at the first node; and
processing the trapped broadcast packet by:
generating, at the first node, an API (application programming interface) call based on the broadcast packet, wherein the broadcast packet comprises an ARP (address resolution protocol) or GARP (gratuitous ARP) packet that corresponds to movement of a virtual IP (internet protocol) address from a first virtual machine on the first node to a second virtual machine on the second node;
directing the API call from the first node to update network metadata in the bare metal cloud infrastructure that maps the virtual IP address to a MAC (media access control) address associated with the second virtual machine; and
updating a mapping of the virtual IP address to the MAC address associated with the second virtual machine at a virtual switch or a virtual router at the second node.

18. The system of claim 17, wherein the virtual switch or virtual router within a hypervisor of the virtualization environment traps the broadcast packet and generates the API call and the virtual switch or the virtual router operates by checking against a rule in a rulebase to determine the API call.

19. The system of claim 17, wherein:

the bare metal cloud infrastructure and additional bare metal cloud infrastructures are provided by a cloud provider to multiple customers and interconnected using the cloud-provided networking infrastructure, the cloud-provided networking infrastructure includes an API coupled to a network update module that updates a set of cloud infrastructure network metadata comprising mappings between virtual IP addresses assigned to respective virtual machines and MAC addresses assigned to respective nodes in response to receipt of API calls at the API, and the bare metal cloud infrastructures are accessible from corresponding user stations coupled to the bare metal cloud infrastructures on a network.

20. The system of claim 17, wherein the trapped broadcast packet comprising the ARP or GARP packet is disallowed or limited on the cloud-provided networking infrastructure.

21. The system of claim 17, wherein updating the mapping of the virtual IP address to the MAC address associated with the second virtual machine at the virtual switch or the virtual router at the second node comprises updating at least one of a routing table or MAC address table to map the virtual IP address to the MAC address associated with the second virtual machine.

22. The system of claim 17, wherein the MAC address corresponds to a vNIC (virtual network interface card) that is associated with a virtual node that hosts the second virtual machine.

23. The system of claim 17, wherein the broadcast packet is from the virtualization environment that is implemented on the bare metal cloud infrastructure.

24. The system of claim 23, wherein the broadcast packet is generated by a virtual machine in the virtualization environment that is implemented on the bare metal cloud infrastructure.

* * * * *